US012615172B2

(12) United States Patent
Portier

(10) Patent No.: US 12,615,172 B2
(45) Date of Patent: Apr. 28, 2026

(54) ERROR MITIGATION TECHNIQUES IN A WIRELESS SYSTEM

(71) Applicant: Silicon Laboratories Inc., Austin, TX (US)

(72) Inventor: Fabrice Christophe Olivier Portier, Cesson-sévigné (FR)

(73) Assignee: Silicon Laboratories Inc., Austin, TX (US)

( * ) Notice: Subject to any disclaimer, the term of this patent is extended or adjusted under 35 U.S.C. 154(b) by 273 days.

(21) Appl. No.: 18/342,995

(22) Filed: Jun. 28, 2023

(65) Prior Publication Data

US 2025/0007756 A1    Jan. 2, 2025

(51) Int. Cl.
H04L 12/66 (2006.01)
H04L 69/22 (2022.01)
H04W 88/16 (2009.01)

(52) U.S. Cl.
CPC .............. H04L 12/66 (2013.01); H04L 69/22 (2013.01); H04W 88/16 (2013.01)

(58) Field of Classification Search
CPC ......... H04L 12/66; H04L 69/22; H04W 88/16
See application file for complete search history.

(56) References Cited

U.S. PATENT DOCUMENTS

| | | | |
|---|---|---|---|
| 7,570,929 B1 | 8/2009 | Trompower | |
| 7,839,845 B2 | 11/2010 | Stephens | |
| 8,750,215 B2 | 6/2014 | Azizi et al. | |

| | | | |
|---|---|---|---|
| 9,191,923 B2 | 11/2015 | Taghavi Nasrabadi et al. | |
| 9,847,849 B2 | 12/2017 | Greenberg et al. | |
| 10,075,309 B2 | 9/2018 | Chen et al. | |
| 11,171,737 B2 | 11/2021 | Liu et al. | |
| 2004/0218522 A1 | 11/2004 | Sundstrom et al. | |
| 2005/0227645 A1 | 10/2005 | Sudo | |
| 2014/0141779 A1* | 5/2014 | Yuk ................... | H04W 28/0815 455/434 |

(Continued)

FOREIGN PATENT DOCUMENTS

| | | | | |
|---|---|---|---|---|
| EP | 1746756 B1 * | 1/2013 | .......... | H04L 1/0066 |
| JP | 2007522686 A * | 8/2007 | .......... | H04B 7/0417 |

(Continued)

OTHER PUBLICATIONS

U.S. Appl. No. 18/342,975, filed Jun. 28, 2023, by Fabrice Christophe Olivier Portier, entitled Scalable Packet Communication in a Long Range Wireless System, 72 pgs.

(Continued)

*Primary Examiner* — Shean Tokuta
(74) *Attorney, Agent, or Firm* — Trop, Pruner & Hu, P.C.

(57) ABSTRACT

In one embodiment, a method includes: receiving, in a receiver of a gateway, from a wireless device a radio frequency (RF) signal including a packet and processing the RF signal to obtain a digital stream; detecting and synchronizing, in the gateway, the packet based at least in part on a preamble of the packet; decoding, in the gateway, a header of the packet to obtain information associated with the packet; demodulating, in the gateway, a data portion of the packet into soft information; and sending at least a portion of the decoded header and the soft information from the gateway to a server coupled to the gateway, to enable the packet to be decoded using the soft information.

20 Claims, 17 Drawing Sheets

(56) References Cited

U.S. PATENT DOCUMENTS

| | | | |
|---|---|---|---|
| 2016/0365952 A1* | 12/2016 | Kim | H04L 1/1816 |
| 2017/0346579 A1 | 11/2017 | Barghi | |
| 2019/0159000 A1 | 5/2019 | Ilami et al. | |
| 2021/0314022 A1 | 10/2021 | Jang et al. | |
| 2023/0237422 A1 | 7/2023 | Trinelli et al. | |
| 2025/0007643 A1* | 1/2025 | Portier | H04L 1/0025 |
| 2025/0007756 A1* | 1/2025 | Portier | H04L 12/66 |
| 2025/0008541 A1 | 1/2025 | Portier et al. | |

FOREIGN PATENT DOCUMENTS

| | | | | | |
|---|---|---|---|---|---|
| JP | 2015534353 A | * | 11/2015 | | H04B 7/0854 |
| JP | 2016502821 A | * | 1/2016 | | H04L 1/0059 |
| KR | 20090083365 A | * | 8/2009 | | H04L 1/0059 |
| RU | 2433533 C2 | * | 11/2011 | | H04W 52/16 |
| RU | 2017114864 A | | 11/2018 | | |
| WO | WO-2008068669 A1 | * | 6/2008 | | H04L 27/2649 |
| WO | WO-2011145884 A2 | * | 11/2011 | | H04L 5/0053 |
| WO | WO-2017034237 A1 | * | 3/2017 | | H04W 88/08 |
| WO | WO-2017034258 A1 | * | 3/2017 | | H04W 52/10 |
| WO | WO-2022054628 A1 | * | 3/2022 | | H04W 92/20 |

OTHER PUBLICATIONS

F. Portier, U.S. Appl. No. 18/193,667, filed Mar. 31, 2023, entitled "Techniques For Robust Wide Area Modulation," 54 pgs.

F. Portier, U.S. Appl. No. 18/193,668, filed Mar. 31, 2023, entitled "Techniques For Reception Of Scalable Sweep Wide Area Modulation Communications," 55 pgs.

D. C. Chu, "Polyphase Codes With Good Periodic Correlation Properties", IEEE Trans. on Inf. Theory, Jul. 1972, pp. 531-532.

United States Patent Office, Reply to Office Action filed Oct. 20, 2025 in United States U.S. Appl. No. 18/342,975 (8 pages).

United States Patent Office, Non-Final Office Action dated Jul. 21, 2025 in United States U.S. Appl. No. 18/342,975 (15 pages).

United States Patent Office, Non-Final Office Action dated Nov. 19, 2025 in United States U.S. Appl. No. 18/342,975 (28 pages).

CS 168 Textbook, All https://textbook.cs.168.io/intro/headers.html (Year: 2025).

United States Patent Office, Reply to Office Action filed Feb. 19, 2026 in U.S. Appl. No. 18/342,975 (10 pages).

United States Patent Office, Office Action dated Mar. 11, 2026 in U.S. Appl. No. 18/342,975 (28 pages).

United States Patent Office, Non-Final Office Action dated Mar. 12, 2026 in U.S. Appl. No. 18/390,199 (37 pages).

* cited by examiner

295a
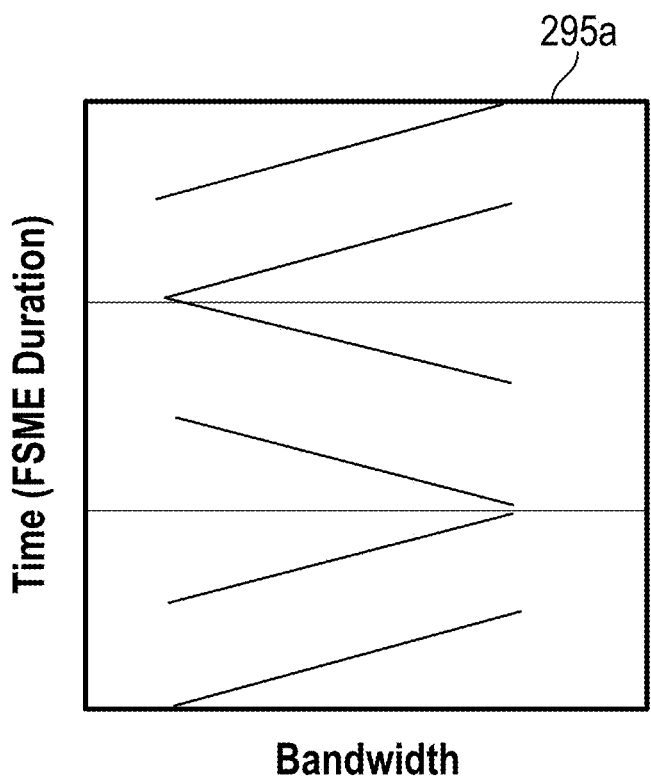
Bandwidth
295b
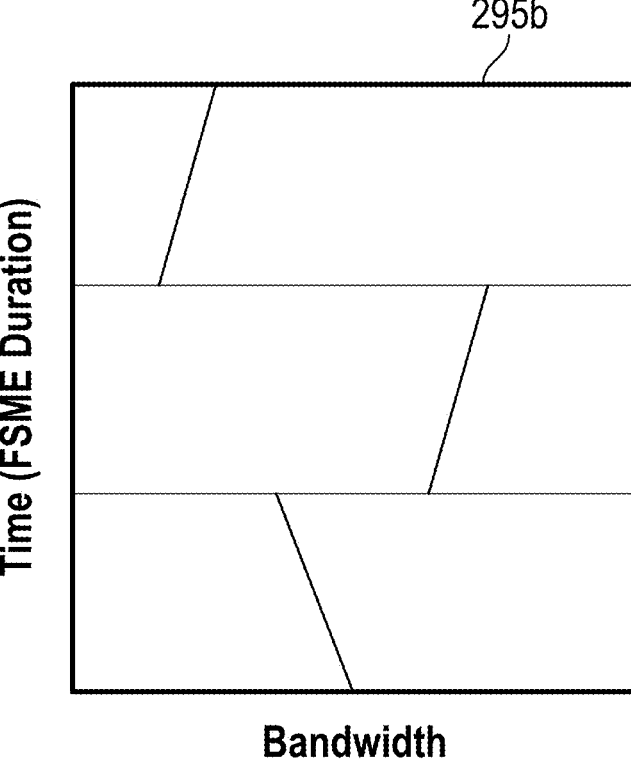
Bandwidth
FIG. 2C

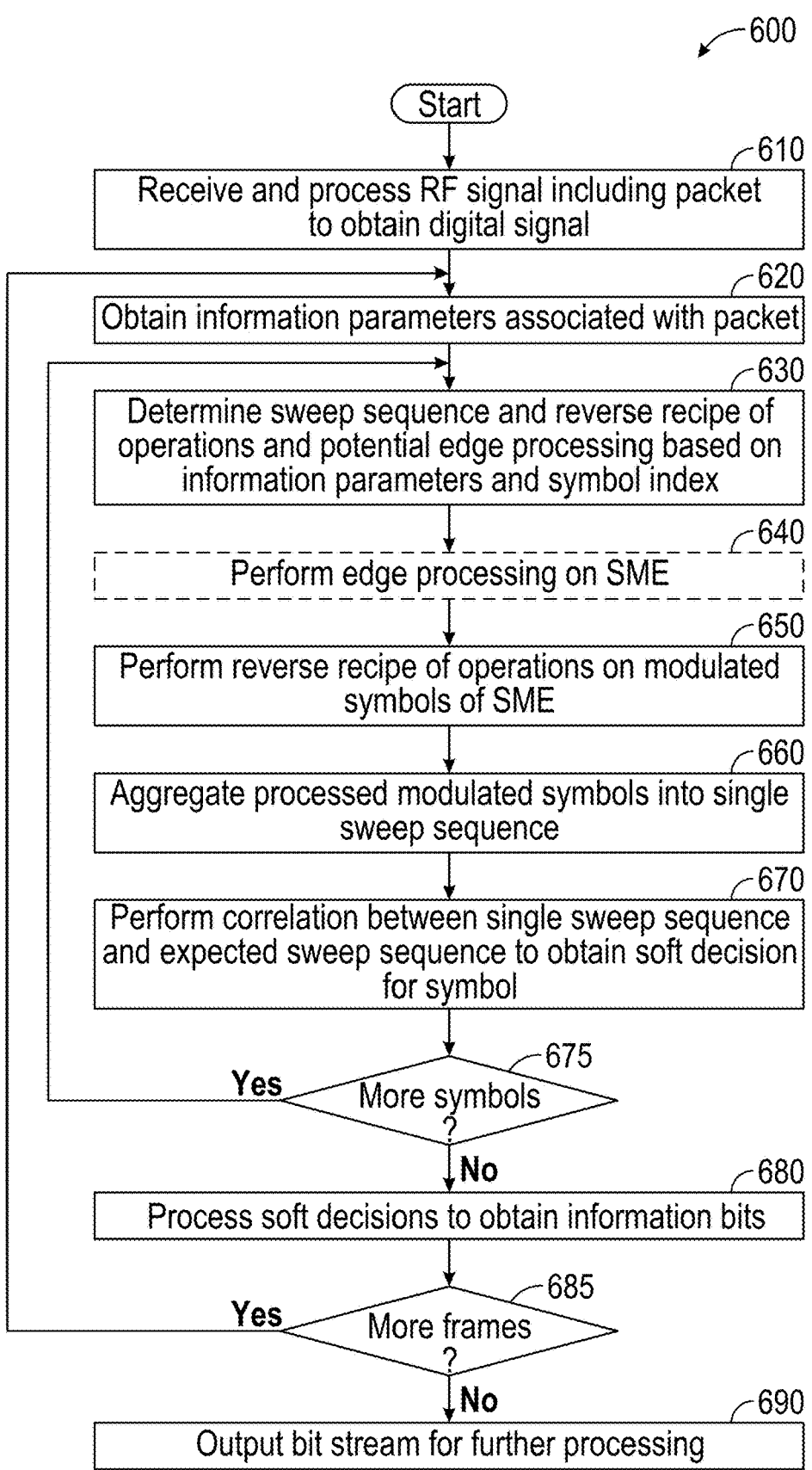

600

Start

610
Receive and process RF signal including packet to obtain digital signal

620
Obtain information parameters associated with packet

630
Determine sweep sequence and reverse recipe of operations and potential edge processing based on information parameters and symbol index 640
Perform edge processing on SME 650
Perform reverse recipe of operations on modulated symbols of SME 660
Aggregate processed modulated symbols into single sweep sequence 670
Perform correlation between single sweep sequence and expected sweep sequence to obtain soft decision for symbol 675
Yes     More symbols ?

No     680
Process soft decisions to obtain information bits

685
Yes     More frames ?

No     690
Output bit stream for further processing

FIG. 6

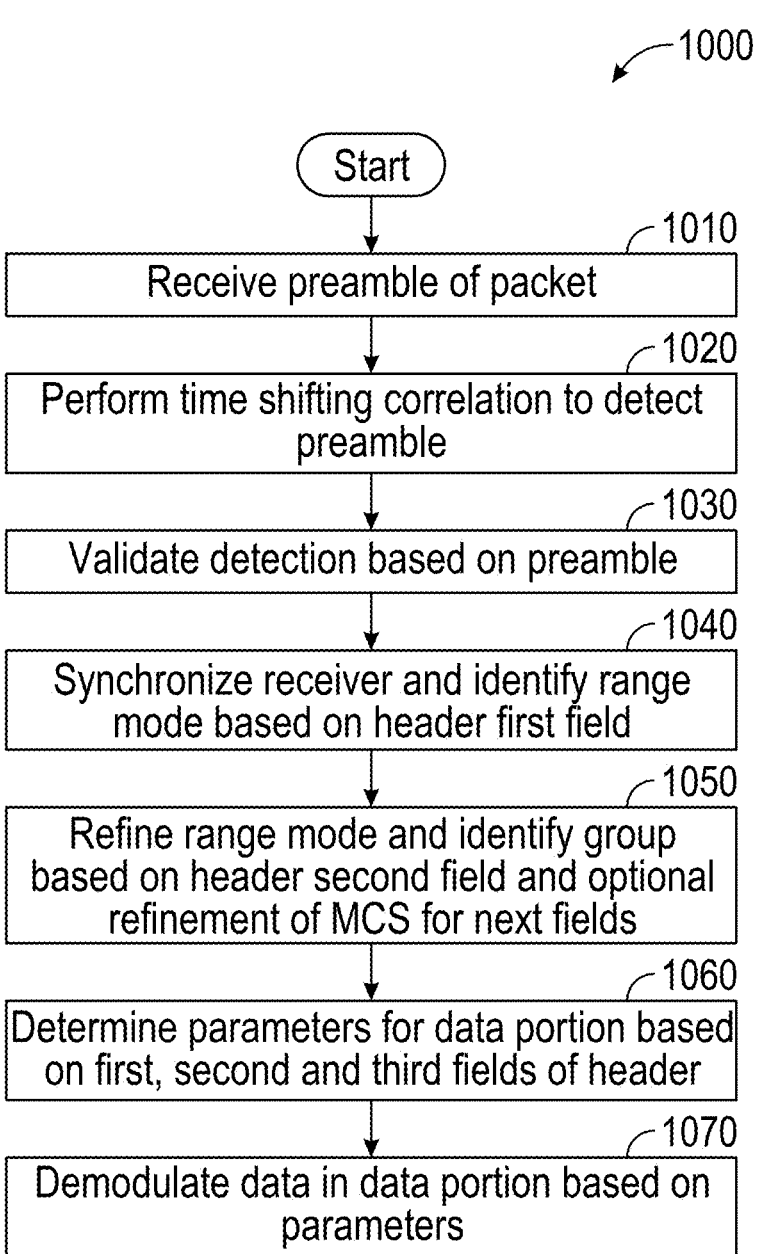

1000

Start

1010
Receive preamble of packet

1020
Perform time shifting correlation to detect preamble

1030
Validate detection based on preamble

1040
Synchronize receiver and identify range mode based on header first field

1050
Refine range mode and identify group based on header second field and optional refinement of MCS for next fields 1060
Determine parameters for data portion based on first, second and third fields of header 1070
Demodulate data in data portion based on parameters

Start

┌─1410
Receive soft information for
packets from plurality of gateways

┌─1420
Identity soft information
for first packet

┌─1430
Recombine soft information
for first packet

┌─1440
Decode data portion from
recombined soft information

┌─1450
Obtain measurement information
from recombined and decoded
data portion

ERROR MITIGATION TECHNIQUES IN A WIRELESS SYSTEM

BACKGROUND

To transmit information efficiently in a communication system, the available resource may be cautiously used with a good spread of energy over the allocated bandwidth and duration. Ideally, for efficient low-cost low-power transceivers, packets should have a reasonable bandwidth and limited power variation over time, i.e., low Peak-to-Average-Power-Ratio (PAPR), and provide solutions to be easily modulated and detected/synchronized/demodulated, even at low Signal-to-Interference-plus-Noise-Ratio (SINR) for a wide range of scenarios. Many current systems are not so scalable, implemented with tradeoffs or worst-case design settings that can increase complexity and power consumption, and waste resources; this reduces the global wireless network performance in real environments. Moreover, unexploited received information from/to wireless devices further waste resources.

SUMMARY OF THE INVENTION

In one aspect, a method comprises: receiving, in a receiver of a gateway, from a wireless device a radio frequency (RF) signal comprising a packet and processing the RF signal to obtain a digital stream comprising the packet; detecting and synchronizing, in the gateway, the packet based at least in part on a preamble of the packet; decoding, in the gateway, a header of the packet to obtain information associated with the packet; demodulating, in the gateway, a data portion of the packet into soft information; and sending at least a portion of the decoded header and the soft information from the gateway to a server coupled to the gateway to enable the packet to be decoded using the soft information.

In an implementation, the method further comprises: identifying a destination for the packet based at least in part on at least one of the preamble and the header; filtering the packet and not demodulating the data portion when the destination is not associated with the gateway; and demodulating the data portion when the destination is associated with the gateway. The method may further comprise demodulating the data portion of the packet into the soft information comprising soft symbol reliability information for a plurality of symbols of the data portion. The method may further comprise demodulating the data portion of the packet into the soft information comprising a plurality of soft bit decisions for a plurality of bits of the data portion.

In an implementation, the method further comprises: determining, in the gateway, signal measurement information associated with the packet; and communicating the signal measurement information to a network controller. The method may further comprise receiving, in the gateway, an update from the network controller, the update comprising updated parameters for communication between the gateway and the wireless device. The method may further comprise sending, from the gateway, a downlink packet to the wireless device based at least in part on the updated parameters. The method may further comprise: demodulating the data portion in the gateway when the signal measurement information is within a range; and not demodulating the data portion in the gateway when the signal measurement information is not within the range.

In another aspect, a method includes: receiving, in a network server, soft information of a data portion of each of the plurality of gateways receiving the packet from a wireless device; recombining the soft information of the packet to obtain aggregated soft information of the packet; and decoding the data portion of the packet based on the aggregated soft information of the packet.

In an embodiment, recombining the soft information of the packet comprises deduplicating duplicated soft information received from at least two of the plurality of gateways. The method may further comprise: weighting a first portion of the soft information received from a first gateway of the plurality of gateways with a first weighting; and weighting a second portion of the soft information received from a second gateway of the plurality of gateways with a second weighting, the second weighting different than the first weighting. Recombining the soft information of the packet further comprises aggregating the weighted first portion of the soft information received from the first gateway of the plurality of gateways and the weighted second portion of the soft information received from the second gateway of the plurality of gateways, to obtain the aggregated soft information.

In an embodiment, the method further comprises: determining first statistical information based at least in part on a first portion of the soft information received from a first gateway of the plurality of gateways; and determining second statistical information based at least in part on a second portion of the soft information received from a second gateway of the plurality of gateways. The method may further comprise selecting one of the first gateway or the second gateway to be a primary downlink gateway for the wireless device based at least in part on the first statistical information and the second statistical information. The method may further comprise updating a network management database based at least in part on the first statistical information and the second statistical information.

In an embodiment, decoding the data portion of the packet based on the aggregated soft information comprises: determining hard decisions for the data portion of the packet based on the aggregated soft information; and obtaining message data of the data portion based on the hard decisions. The method may further comprise receiving, in the network server, at least one of: header information of the packet from at least some of the plurality of gateways; and measurement information regarding the packet from at least one of the plurality of gateways.

In yet another aspect, a system includes a plurality of gateways to receive packet communications from a plurality of wireless devices in a long range wireless network, and at least one server coupled to the plurality of gateways. Each of the plurality of gateways may include first hardware circuitry, first memory, and first storage. And each of the plurality of gateways may be configured to: receive, from at least one of the plurality of wireless devices a RF signal comprising a packet and process the RF signal to obtain a digital stream comprising the packet; decode a header of the packet to obtain information associated with the packet; demodulate a data portion of the packet into soft information; and send at least a portion of the decoded header and the soft information to at least one server. The at least one server may include processing circuitry, second memory, and second storage. And the at least one server may be configured to: receive the at least portion of the decoded header and the soft information from at least two of the plurality of gateways; recombine the soft information of the packet to obtain aggregated soft information; and decode the data portion of the packet based on the aggregated soft information of the packet.

In an embodiment, the at least one server comprises a network server to select, based at least in part on statistical information, one of the plurality of gateways to be a primary downlink agent for a first wireless device of the plurality of wireless devices. The at least one server may be configured to: deduplicate duplicated soft information received from the at least two of the plurality of gateways; weight a first portion of the soft information received from a first gateway of the plurality of gateways with a first weighting; weight a second portion of the soft information received from a second gateway of the plurality of gateways with a second weighting, the second weighting different than the first weighting; and aggregate the weighted first portion of the soft information received from the first gateway of the plurality of gateways and the weighted second portion of the soft information received from the second gateway of the plurality of gateways, to obtain the aggregated soft information.

In one embodiment, a method includes: receiving, in a receiver of a gateway, from a wireless device a radio frequency (RF) signal including a packet and processing the RF signal to obtain a digital stream; detecting and synchronizing, in the gateway, the packet based at least in part on a preamble of the packet; decoding, in the gateway, a header of the packet to obtain information associated with the packet; demodulating, in the gateway, a data portion of the packet into soft information; and sending at least a portion of the decoded header and the soft information from the gateway to a server coupled to the gateway, to enable the packet to be decoded using the soft information

BRIEF DESCRIPTION OF THE DRAWINGS

FIG. 2C shows example symbol modulated and extended illustrations in accordance with an embodiment.

FIG. 6 is a flow diagram of a method in accordance with another embodiment.

FIG. 10 is a flow diagram of a method in accordance with another embodiment.

DETAILED DESCRIPTION

Figure 1:
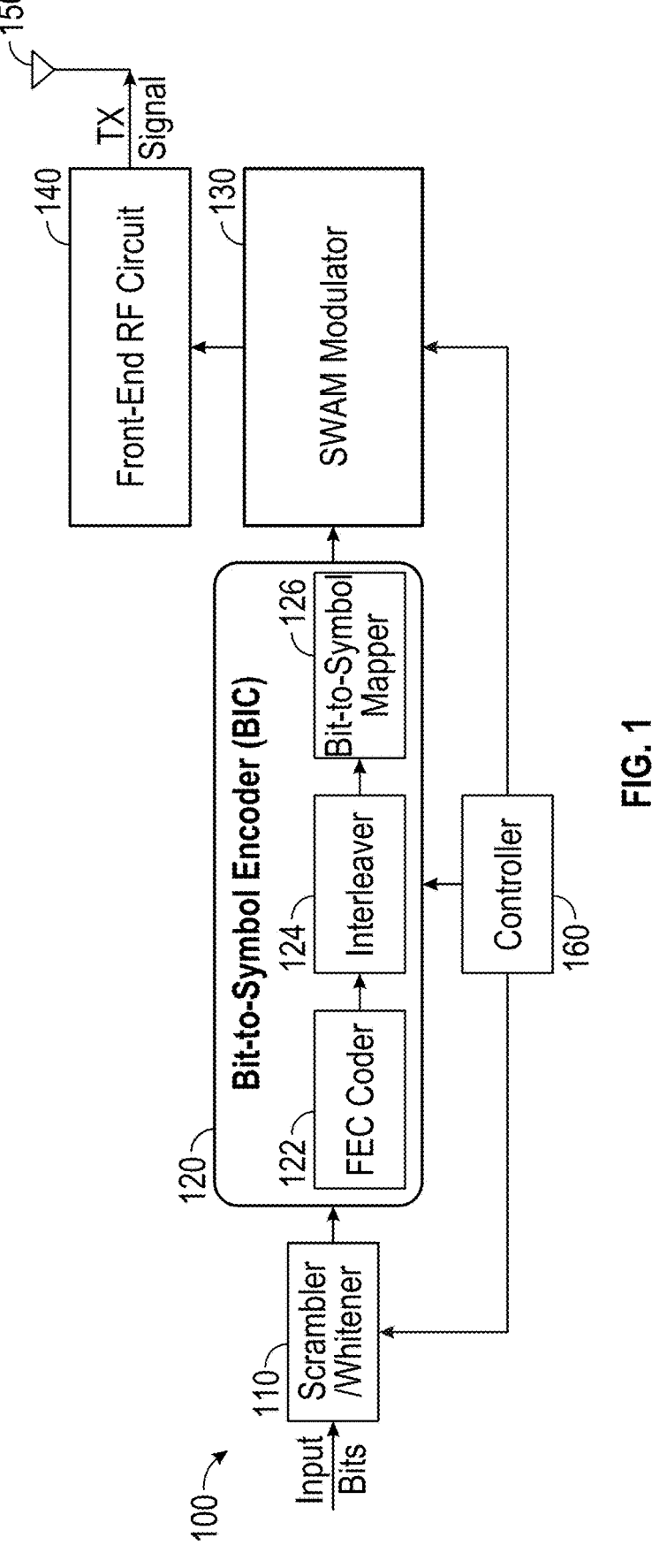
FIG. 1 is a block diagram of a transmitter in accordance with an embodiment.

In various embodiments, a transmitter is configured to perform modulation of communications for long-range scenarios. Although embodiments are not limited in this regard, as an example a transmitter can be configured to dynamically control modulation aspects to enable transmission of wireless signals over relatively long ranges, e.g., of up to approximately a few tens or hundreds of kilometers.

In embodiments, Constant Amplitude, and in particular Constant Amplitude Zero Auto-Correlation (CAZAC), sequences may be used to perform modulation. In general, a CAZAC sequence is a polyphase sequence having periodic complex-valued signals with a modulus of one and out-of-phase periodic (cyclic) auto-correlations equal to zero. In an embodiment, an example for construction of such signal sequences may be a combination of well-chosen quasi-CAZAC sequences and Orthogonal Frequency Division Multiplexing (OFDM) principles. The chosen CAZAC sequences may be close to Zadoff-Chu (ZC) sequences, or more generally Generalized Chirp Sequences (GCS). Such a GCS-precoded or ZC-precoded OFDM signal can be used as a basis to define a modulation scheme robust for long-range scenarios. These sequences may optionally be transformed into another domain using Fourier Transforms (Discrete Fourier Transform (DFT) or Fast Fourier Transform (FFT) processing) of OFDM systems, with potential further signal processing to shape the signal (e.g., windowing, filtering, power compression), to provide desired properties. Such sequences are referred to herein as Sweep-Sequences (SS), or more generally "sequences" and may be formed of tens to thousands of complex-valued samples.

A Generalized Chirp sequence (GCS) of complex samples, of length $N_{zc}$ and parameters (P,Q,U,S), could be defined with the following equation:

$$S_{GCS(Nzc,P,Q,U,S)}[n] = \exp\left(j\left(P + \frac{2\pi}{N_{zc}}\frac{Q}{2}n + \frac{2\pi}{N_{zc}}\frac{U}{2}n^2 + \frac{2\pi}{N_{zc}}\frac{S}{2}n^3\right)\right),$$

$$0 \le n \le Nzc - 1$$

where P, Q, U, S do not need to be integers.

As a subset, a root Zadoff-Chu sequence of complex samples, of length $N_{zc}$ and root u, with potential cyclic shift q is defined with the following equation:

$$S_{zc(Nzc,u)}[n] = \exp\left(-j \cdot \pi \cdot n \cdot (u(n + c) + 2q)/N_{zc}\right), 0 \le n < N_{zc},$$

where c is generally 0 for even $N_{zc}$ and 1 for default odd $N_{zc}$ (ensures cyclicity/continuity if repeated); u is an integer identifying the ZC sequence, called a root index. ZC is a particular case of GCS with S=0, P=0, integer u=−U, q=−Q/2 when $N_{zc}$ is even, and q=−(Q/2+U/2) when $N_{zc}$ is odd.

These ZC are polyphase sequences with perfect periodic auto-correlation function (i.e., complex sequences with unit amplitude and null auto-correlation for all cyclic shifts except zero). However, compromises considering pool of sequences with low shifted auto-correlation and low inter-correlations could be sufficient for a given application.

OFDM (I)DFT conversion for $N_f$ complex samples is in accordance with the following equation:

$$X[k] = \frac{1}{\sqrt{N_f}} \sum_{n=0}^{N_f-1} x[n] \cdot \exp(\pm j \cdot 2\pi \cdot n \cdot k/N_f), \; 0 \leq k \leq Nf - 1.$$

DFT (or FFT) processing ensures signal continuity at sequence edges, and also allows resampling (final SS bandwidth can differ from initial/sampling bandwidth, filling edge FFT bins with zeros, e.g., when Nf>Nzc).

ZC-OFDM is the combination of these two processing functions, with potential intermediate-and/or post-processing to shape the signal (e.g., centering, filtering, windowing, shifting, compressing in power). After the selection of sizes ($N_{zc}$, $N_{fft}=N_f.L$) and sampling rates (that also define the SS bandwidth and duration), there can be several imaginable sequences that are quasi-orthogonal (up to Nzc for ZC-OFDM with integer u). Note that sequences can be L-oversampled to further improve the signal shaping and properties (e.g., finer tuning/filtering and management of PAPR/Out of Band (OoB) using higher FFT of length $N_{fft}=N_f L$ instead of $N_{fft}=N_f \geq N_{zc}$).

As another subset of GCS with U=0 and S=0, ultra-narrow-band simple carriers (constant frequency per block) sequences or hopping single-carrier sequences are also particular cases with low PAPR and some capabilities to provide several orthogonal sequences (or semi-orthogonal once different coding/hopping and/or Recipe of operations are applied for each user), e.g., for different values of even Q in [0, . . . $N_{zc}$] in the GCS equation above. Piecewise-non-sweeping ultra-narrow-band sequences may appear less robust, for a given SS, than the presented CAZAC sequences regarding some noises and interferences, but robustness and good use of the allocated spectrum can be recovered from the Recipes described later in this document. Then, hopping subcarriers (piecewise pure sinusoids) to design a list of sequences is also a low-rate solution to share a scarce resource, and is equivalent to precoded-OFDM with the precoding vector of size Not being all zeros except one element at once (1 complex value on the unit circle). However, a general receiver for that case may need different algorithms with potential higher complexity to demodulate or synchronize, just as less optimal spectrum (and potential dependency on filtering processes) compared to ZC and ZC-OFDM sequences. Moreover, presenting a different spread of energy over time, depending on the considered averaging periods to compute the spectrums, solutions that are more 'peaky in frequency' could be more restricted in power by regulations to access some wireless channels/bands.

As another intermediate example list of sequences, a subset of GCS with low sweeping slopes (non-integer 0<|U|<1 and/or more zeros on edges in a following OFDM FFT) and S=0, can provide sweeping sequences with low PAPR and capabilities to provide several orthogonal sequences (or weakly correlated) with another balance on robustness to interferences in time/frequency, number of simultaneous packets on the same band, and management of Groups. The related spectrum per SS does not spread the energy as equally as GCS/ZC-based sequences with integer U≥1, but the description of Recipes in next processing stages will allow to further spread properly the signal over the whole system bandwidth, while still allowing simplified receiver processing of sweeping sequences in real channels (with multipath interference). Simple receivers with robustness to any noise, including localized interferers 'peaky-in-frequency' and 'peaky-in-time', are possible with weighted aggregation of such blocks from the modulation. Then, from presented equations and solutions, users in the field can readily adjust parameters and durations to meet the requirements and regulations.

In one or more embodiments, a transmitter may generate and/or store a pool of such sequences. These sequences may be particularly optimized for long range wireless communications, with particular properties including the following. The sequences may enable good shapes in time and frequency that are better than generic (worst-case) OFDM, having low power variations over time (low PAPR), and good shaping in frequency (aiming ideal spectrum for the application, with low Out-of-Band emissions), as presented above. These sequences may further have good auto-correlation and cross-correlations figures, i.e., localized auto-correlation (almost null except for zero-shift auto-correlation).

Collectively, the list of sequences can be rather orthogonal (i.e., with low correlations with any shift among the list) to efficiently identify a given SS and its shift. Further optimizations with the selected modulation may include continuity when repeated (ZC, ZC-OFDM, and any precoded-OFDM sequence are already circular/continuous sequences); low impact when modulated (reduced edge effects like discontinuities involving out-of-band emissions, modified PAPR and lost power); and simple demodulation solutions (either in frequency or time domain, generally based on frequency-sweep-like properties, and/or symmetries).

Note that ZC values are naturally quasi-orthogonal when considering different integer root values u, and a couple of sequences with values of u generally corresponding to low sweeps (e.g., {1,2,3}) per block may offer good trade-offs with rather low PAPR once frequency-transformed. Note that the DFT of a ZC sequence, with $N_{zc}$ prime, is still a ZC sequence (keep constant amplitude with good correlation properties), while there is no intermediate processing.

Several properties like symmetries/repetitions can exist among sequences (e.g., the conjugate of a sequence is generally its reversed-ordered version when sequences are anti-symmetric, generally representing a frequency sweep in the other direction and $u'=N_{zc}-u$) and could also save memory. These sequences are often close to frequency-sweep sequences (CSS could be seen as a particular case of ZC-OFDM with the simplest sweep over the full $N_{zc}=N_{fft}$, with u=1 and without windowing), i.e., could approach one or several tones sweeping (less than one, one or several times) on the allocated area (given bandwidth and sequence duration).

Using such a SS as a basis, a Symbol Modulated and Extended (SME) can be generated to efficiently transmit information. SME is the combination of a modulation of the SS and an extension of that signal that is repeated (e.g., an integer number of modulated SS like 4 repetitions to simplify description). In addition, each of these extended SS's may have one or more operations (from Recipe) performed on it, as described further below.

Note that in one embodiment, the same SS is used for the repetitions in the given SME (even if a potentially different operation is performed on each repeated SS inside the SME). In an embodiment to simplify, a limited set of operations inside a SME may be used. For example, in one implementation, these operations may include: time reversal (and/or conjugate operator), i.e., SS'(n)=SS(N−n), n=0, . . . N−1; phase operations (e.g., extended generic case of +/−{1,j}), i.e., SS'(n)=exp(j.θ).SS(n); frequency shifts (e.g., from a numerically controlled oscillator (NCO)), i.e., SS'(n)=SS(n)·exp(j.2π.δ.n/N) with typically |δ|≤1 if the small/fractional frequency shift is mainly used to improve signal continuity at edges or spectrum use, or any larger δ if frequency shifts are also used to manage interference-mitigation; and/or a combination of any of these three operations.

Note that SME extension is presented as a repetition of an integer number of SS to simplify description, but could also be slightly extended, similarly to OFDM Cyclic Prefixes, to better manage SME edges in real channels with echoes. As an example, instead of a cyclic extension of 3 times the SS, to have 4 cyclic repetitions of the SS, there can be 4.25 cyclic repetitions of the SS (to have a quarter symbol to smooth the signal and minimize inter-symbol interferences when there are echoes and filtering).

Note that in embodiments, SS inversion (minus) and pi/2-rotation (j) are particular cases of the phase operator, and conjugation is generally a particular case of time-reversal (sequence played in the other direction, when sequences depict symmetries) with a potential frequency-shift.

An additional variation of the selected SS and/or Recipe of operations at each new SME is possible to further extend Packet Interference Mitigation (PIM) in heavy network-loaded contexts (to increase simultaneous users without high performance drop). Encoding using adapted bit-level forward error correction (FEC) and interleaving may also be used to tolerate remaining spread errors and local interferences impact. As an example, a proper block FEC spreads information bits as much as possible on the considered block of the frame. Generic block encoding/decoding may be used (e.g., for packet headers), to adequately spread (interleave/encode/map) the information bits to symbols with a priori equal 'information weight' to be robust in the channel. In a particular embodiment, each information bit (after BIC encoding) is spread on several symbols, and several bit-levels (from MSB to LSB, as a symbol, among 2, can contain M bits) of these symbols, to leverage/mitigate potential biased SINR per information bit. In practice, precomputed block matrices G (size K×N) can be predefined for each potential K/N couple of headers. But a combination of smart interleaving/FEC encoding and symbol mapping to spread information bits is also possible.

The combination of SS repetitions and operations on these repetitions inside SMEs enables an increase in robustness to channel effects, noises, blockers, and especially interferences from the same kind of packets transmitted simultaneously on the same bands (e.g., of other users). At the same time, simple and efficient recombinations can be performed at a receiver having a priori knowledge of the transmitter modulation schemes and recipes. Embodiments may also present a good spread of energy over the dedicated bandwidth and SME duration.

Moreover, another optional feature considers progressive knowledge/refinement of a user group/ID along the packet (from signaling parts to final payload) allowing a receiver to efficiently receive expected packets or stop demodulation as soon as the frame is not going to succeed for the given user, improving power-savings.

Embodiments implementing Sweep Wide-Area Modulation (SWAM) can be seen as a modulation technique for an entire packet or one or more portions of a packet (e.g., a data portion). Depending on implementation, such precoded-OFDM modulations may be included as an extra mode or "modulation and coding scheme" (MCS) of a Wireless-Smart Ubiquitous Network (WiSUN-OFDM), or as a building block of a new and optimized system/standard, more flexible, and superset of a Large-Scale Low-Rate Network (like IEEE 802.15.4g WiSUN).

Referring now to FIG. 1, shown is a block diagram of a transmitter in accordance with an embodiment. More specifically, as shown in FIG. 1 transmitter 100 is configured to transmit packets according to a SWAM communication protocol in accordance with an embodiment. In the view of FIG. 1, all components (except for an antenna 150) may be implemented on one or more dies of an integrated circuit (IC). In some cases, all of the circuitry may be implemented on a single semiconductor die, while in other cases multiple dies may be present within an IC package. Transmitter 100 may be configured to leverage each information-bit (for reliability) at antenna 150 over a dedicated block, adapted to the selected modulation order and coding scheme.

As shown, incoming information in the form of an input bit stream (which may be generated within digital circuitry of the transmitter or a device coupled to the transmitter) are input into a scrambler 110. In various embodiments, scrambler 110 (which can be optional in some embodiments) may scramble and/or whiten the incoming bits, which are then provided to a bit-to-symbol encoder (generally encoder 120). In the high-level view of FIG. 1, encoder 120 is shown with constituent components, including an encoder 122, an interleaver 124, and a mapper 126. Encoder 122 is configured to perform FEC coding on the incoming bits. In turn the encoded bits are provided to an optional interleaver 124, which may interleave the incoming bits in accordance with a given interleaving scheme. The interleaved bits are then provided to mapper 126, which performs optional reordering and bit-to-symbol mapping to thus output a corresponding symbol from one or more of the incoming bits. Note a well-chosen block FEC could do all-in-one 'smart bit-to-symbol' encoding and mapping (especially for small blocks like headers), removing the need for extra interleavers and remappers/reordering.

Still with reference to FIG. 1, the symbols are provided to a SWAM modulator 130. As will be described herein, SWAM modulator 130 may perform a modulation of incoming symbols using a SS sequence. In addition, the modulated symbol may be extended, with the symbol repeated, e.g., copied one or more times. Then additional processing may be performed on each of these symbol copies, namely, a so-called Recipe of operations. Thereafter, optional signal shaping may be performed.

A resulting series of modulated and extended symbols (SMEs), optionally shaped/filtered/smoothed, is provided to a radio frequency (RF) front end circuit 140. Various digital and analog processing may be performed, including upconversion to RF level, filtering, gain control and amplification (including in a power amplifier of RF front end circuit 140), to result in a transmit RF signal that is transmitted via antenna 150.

Still with reference to FIG. 1, a controller 160 is present. In various embodiments, controller 160 is configured to control the constituent components of transmitter 100. In particular embodiments, controller 160 may be a programmable hardware circuit that is configured to execute instructions such as may be stored in one or more non-transitory storage media.

In embodiments, controller 160 may, based on various parameters, control selection of the type of scrambling, encoding, interleaving, reordering and symbol mapping. In addition, controller 160 may, based at least in part on input parameters and/or symbol index, determine an appropriate SS to be used for modulation, and determine an appropriate Recipe of operations to be performed on the SS. Still further, controller 160 may be configured to control any optional signal shaping performed in SWAM modulator 130. Although shown at this high level in the embodiment of FIG. 1, many variations and alternatives are possible.

Figure 2A:
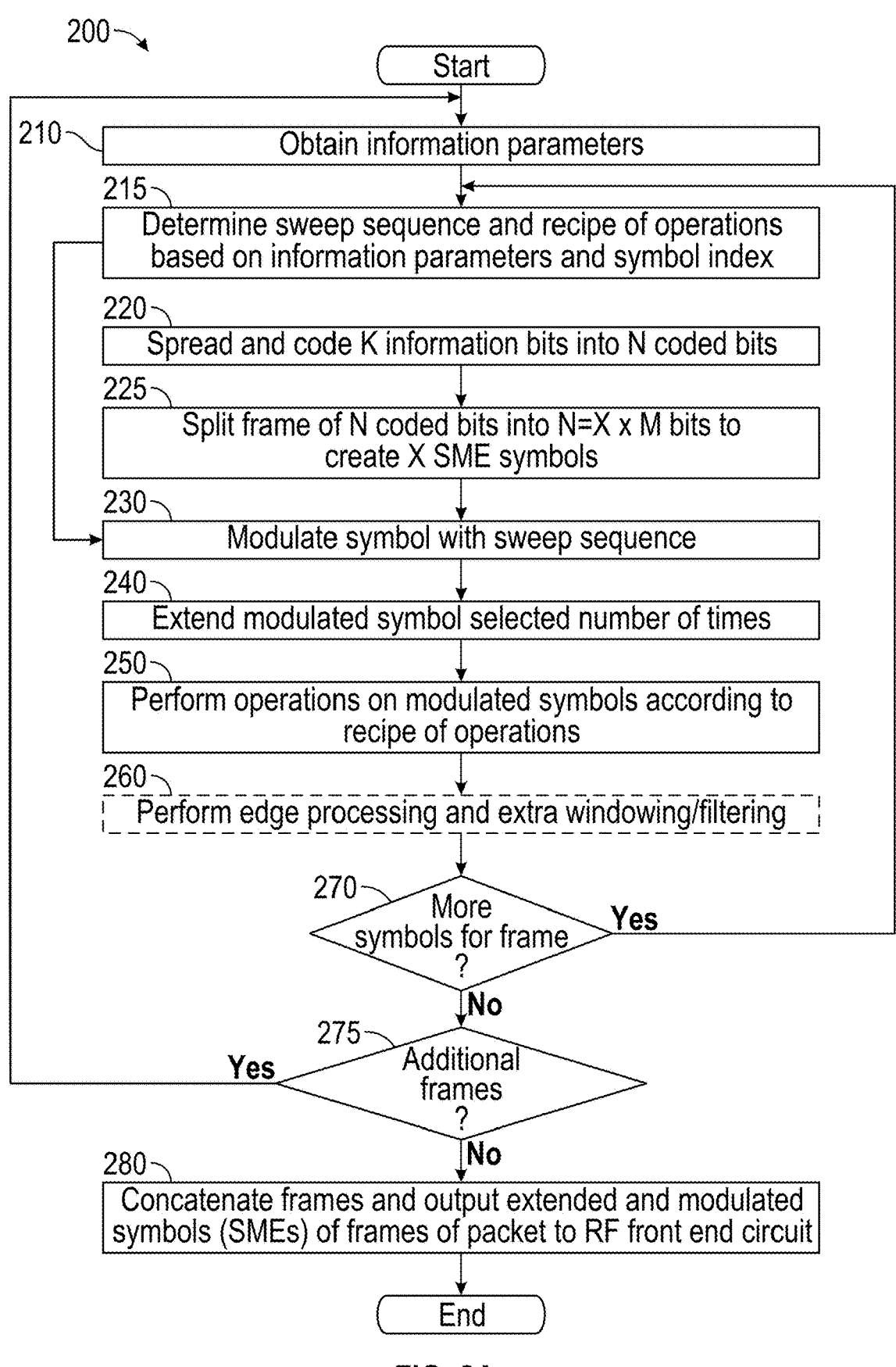
FIG. 2A is a flow diagram of a method in accordance with an embodiment.

Referring now to FIG. 2A, shown is a flow diagram of a method in accordance with an embodiment. More specifically as shown in FIG. 2A, method 200 is a method for processing an incoming bit stream in a transmitter in accordance with an embodiment. As such, method 200 may be performed by hardware circuitry such as the transmitter shown in FIG. 1, alone and/or in combination with firmware and/or software. In such embodiments, the hardware circuitry is configured to execute instructions stored in one or more non-transitory storage media.

Method 200 demonstrates an overall flow for generation and communication of a packet from a transmitter to one or more receivers. In general, the flow of method 200 is illustrated for operations that can be performed iteratively for different portions (frames) of an overall packet.

As shown, method 200 begins by receiving information parameters (block 210). These information parameters may be received in a controller of the transmitter. Such information parameters may include certain fixed information parameters for a given type of modulation scheme. In addition, these information parameters may include information received from a network, and feedback information (or measurements) regarding (prior or current) communications from/to the transmitter.

Particularly relevant information parameters may include range information (regarding an estimated signal quality or distance between the transmitter and one or more receivers), group information, and "modulation and coding scheme" (MCS) information. Next, control passes to block 215, where the controller may determine a SS and a Recipe of operations based at least in part on at least some of the information parameters and a symbol index. As will be described, this determination is thus a dynamic determination that may be performed for each extended block of information to be communicated. The determination of blocks 210 and 215 may be performed by a controller of the transmitter.

As further shown in FIG. 2A, a set of incoming information bits (e.g., K bits) may be spread and coded into N coded bits (e.g., by performing FEC coding) (block 220). Thereafter this frame of N coded bits may be split into X.M bits (where M is a group of bits) to create X SME symbols (block 225). These operations may be performed in a bit-to-symbol encoder in accordance with an embodiment.

Still with reference to FIG. 2A, at block 230 a given symbol may be modulated with the selected SS within a SWAM modulator. Thereafter at block 240, this modulated symbol may be extended, e.g., using copies, a selected number of times. Although embodiments are not limited in this regard, in one implementation the determination of the number of times that a modulated symbol is extended or copied may be based on a cyclic prefix configuration parameter (CP$_x$) that, in turn, is based on a given MCS. Thus, at this point there are a given number of identical modulated symbols present.

Still with reference to FIG. 2A, next at block 250 a set of operations may be performed on each of these modulated symbols according to the Recipe of operations, as determined above at block 215. Depending on information parameters, this set of operations may be the same or different for given ones of the modulated symbols. This resulting extended block of modulated symbols is referred to herein as an SME block.

Still referring to FIG. 2A, at optional block 260 (shown in dashed form), additional signal processing may be performed on the SME blocks. For example, various signal shaping such as edge processing and/or windowing/filtering may be performed to smooth edges, which may involve several SMEs (e.g., a current SME and a previous SME to filter edges). In implementations, the determination of whether to perform such operations as well as the type of operations also may be determined based upon one or more of the information parameters. Control next passes to diamond 270 to determine whether there are more symbols within the frame to be transmitted. If so, control passes back to block 215. If not, control passes to diamond 275 to determine whether there are additional frames within the packet. If so, control passes back to block 210 for obtaining further information parameters.

Instead when a packet is completed, control passes to block 280 where multiple frames of the packet are concatenated and the extended and modulated symbols of the frames of the packet, optionally shaped/filtered/smoothed, are output to an analog RF front end circuit for upconversion and then transmission via a power amplifier and antenna. Although shown at this high level in the embodiment of FIG. 2A, many variations and alternatives are possible.

In one or more embodiments, SS's can be constructed with optional features to provide sequences having desirable properties that enable flexibility for different environments (e.g., ranges, simultaneous users, packet interference mitigation, and so forth). In an embodiment, a sequence may be generated using a GCS equation as described above. Additional operations optionally can be performed. For example, a portion of a sequence may be extracted/processed, such as performing a centering/shifting, removing one or more central values (DC=mean), ensuring symmetry, filtering edges, and/or adding zeros at edges. Understand that in different use cases, one or more of these optional operations may be performed to derive a sequence. In some implementations, this sequence may further be transformed into the frequency domain via a FFT operation. Further derivations can be performed on a transformed sequence using operations like Recipes (e.g., via a numerically controlled oscillator (NCO)) and potential windowing, to provide the final SS.

When a given SS list is selected for use in modulation, SMEs are constructed. For each symbol, a given SS is selected from the SS list using Group information and optionally symbol index. Then the SS is modulated with the symbol value (e.g., via a circular time shifting and/or a frequency shift (using an NCO)). The resulting modulated SS is extended to SME size (e.g., with CP$_x$ copies). Then based on PIM information and symbol index, a set of operations can be performed according to a Recipe of operations. Finally, potential edge processing and/or additional windowing/filtering may be performed (which may depend on SS and selected Recipe).

Figure 2B:
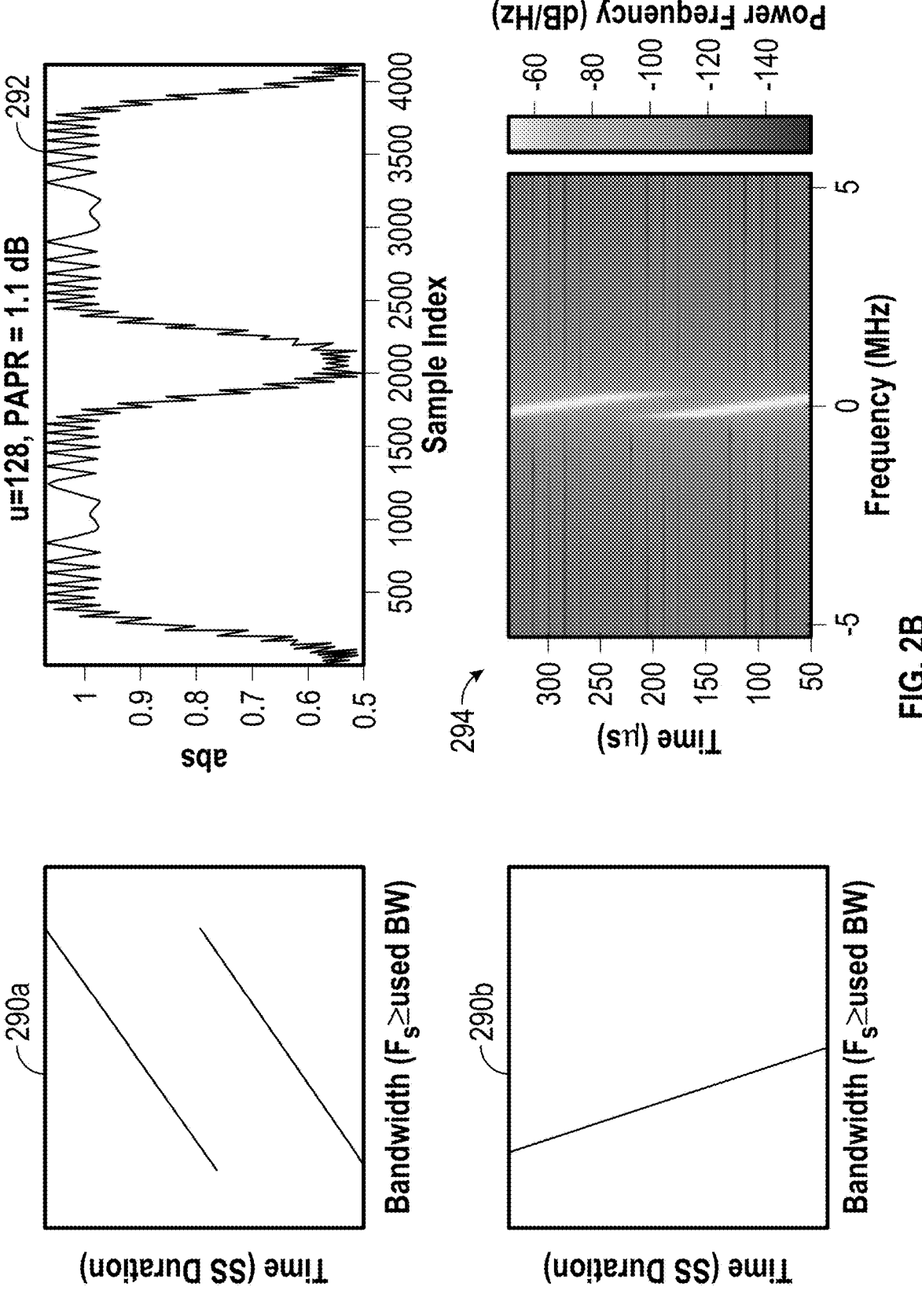
FIG. 2B shows example sweep sequences and graphical illustrations in accordance with an embodiment.

Referring now to FIG. 2B, shown are example SSs and graphical illustrations in accordance with an embodiment. In FIG. 2B, SSs 290*a,b* are two examples of a sweep sequence that have different slopes and bandwidth over time. As seen, the SSs are filtered/zeroed at their edges such that their bandwidth is less than a sampling frequency. Graphical illustration 292 shows a transmitted SS having quite low PAPR, and illustration 294 shows an energy spread over time/frequency. While these figures provide only limited illustration regarding the Recipe of operations in the complex domain (only displays absolute power here), they provide an example of possible solutions to manage continuity, shaping optimization, orthogonality, and spread of energy in time/frequency.

Referring now to FIG. 2C, shown are example SMEs in accordance with another embodiment. In FIG. 2C, SMEs 295a,b are two SME examples that have different SSs and Recipes over time.

Figure 3:
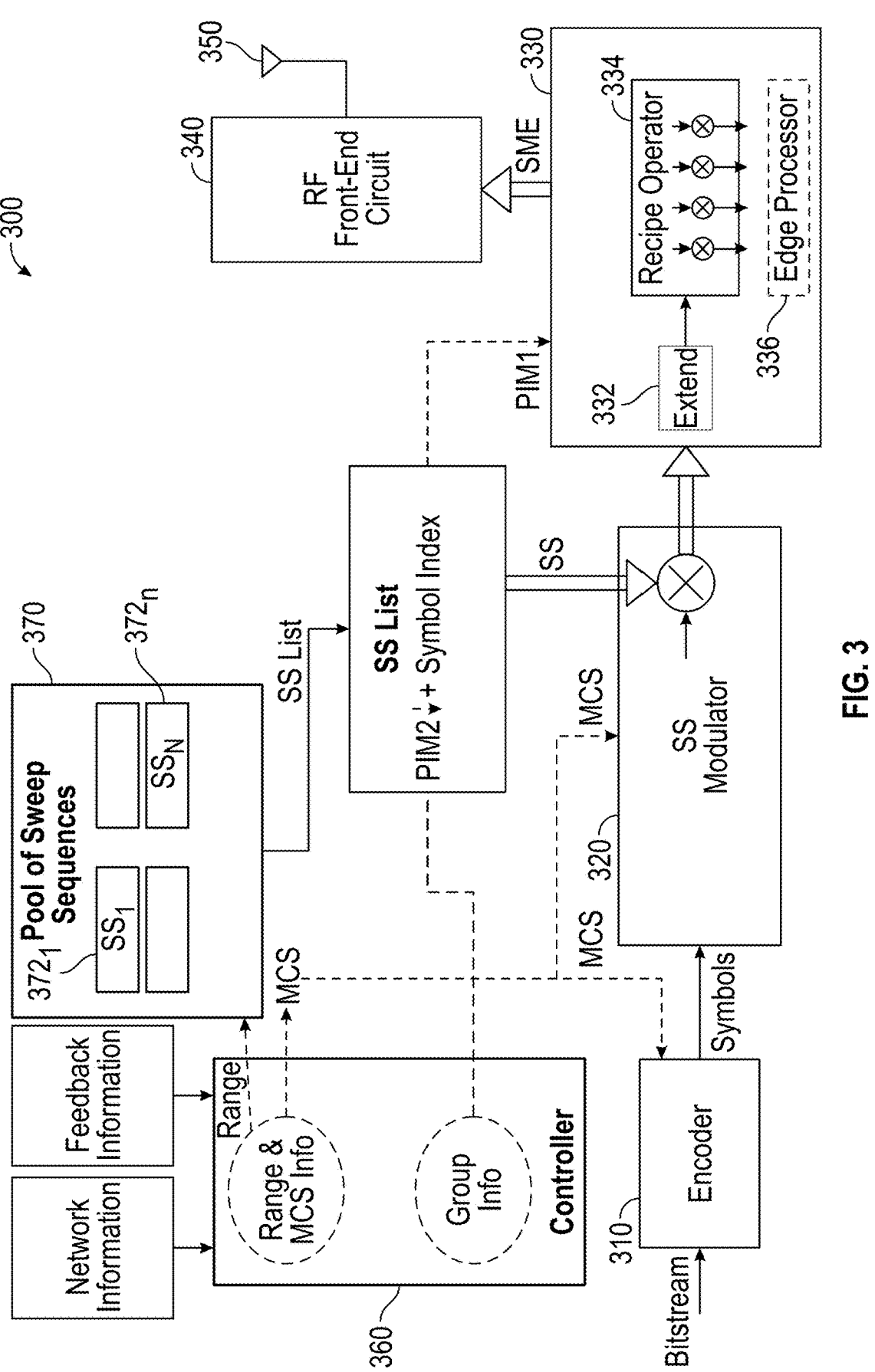
FIG. 3 is a block diagram of a more detailed implementation of a transmitter in accordance with an embodiment.

Referring now to FIG. 3, shown is a block diagram of a more detailed implementation of a transmitter in accordance with an embodiment. As illustrated, transmitter 300 includes various hardware, firmware, and software that forms a signal processing path to receive, code, modulate and transmit an incoming bit stream. In addition, a controller 360 is coupled to the signal processing path to determine selection of an appropriate SS, modulation scheme, replication, and Recipe of operations to be performed on the replicated modulated SS. To this end, controller 360 may be a programmable hardware circuit that is configured to execute instructions such as may be stored in one or more non-transitory storage media.

As shown, controller 360 can receive a variety of parameters, including information received from a network as well as feedback information and/or measurements. In an embodiment, the network information may include framing structures, tables of possible MCSs for a given Range, Groups and Recipe information and ways to select among a subset, and the feedback information may include channel characteristics (or measures) to select the Range and MCS and keys to define the Group information. In an embodiment, the Group information may be a value for a user in a cell area be as low as possible interfering with other signals, allowing selection of adequate SS and Recipes (avoiding similar waveforms in the same area).

In one or more embodiments, the main parameters for determining a modulation configuration are derived from Range, MCS and Group parameters. In an embodiment, the distance with respect to transmitter 300 (e.g., less than a first distance threshold). As distance (e.g., greater than the first distance threshold) and/or number of simultaneous users increases (e.g., greater than the first user threshold), range and PIM information may be used. And as further users and/or distance increases (e.g., greater than another distance and/or user threshold), range, PIM information and symbol index may be used to determine modulation configurations.

In light of the above discussion and depending on environment, there may be flexibility for at least three dimensions/types of information parameters to adjust the modulation to the environment/application: including Range, MCS (to select at least nb bits per symbol, i.e., nb modulation e.g., circular-shift possibilities per SS to handle channel echo impact, and FEC details and rate) and Group information. In this way, embodiments enable adaptation of Range, MCS, and Group for packet interference mitigation, to target a low error probability in any environment and condition.

Referring now to Table 1, shown is an example of MCS pool definition in accordance with an embodiment, e.g., for long-range scenarios with SS sequences of size $N_f*L=128*2$. The number of repeated SS per SME is equivalent to x+1 in the CPx notation of this Table; e.g., "CP3" means a cyclic-prefix of 3 corresponding to 4 SS per SME. In this arrangement, here we consider TimeShift modulation with 2 to 64 shift states depending on the MCSy index. However, with more than 16 states (4 bits per FSS), performance can be degraded if channel impulse response is large (interfering echoes), generally limiting high MCS to high-throughput transmissions in favorable scenarios (low CIR) to keep receivers simple. Shown in Table 1 are 8 MCSs, which may be encoded using 3 additional MCS-signaling bits per given RANGE (here is a range with sequence length 128).

Following Table 1, shown is Table 2, which is an example definition for a particular MCS index (index 2).

TABLE 1

Example of MCS pool definition
For Long-Range scenarios with SS sequences of size $N_f*L = 128 * 2$:

| | | LRSW FASWAM-TS MCS Proposal (base sequence duration = 192 μs) | | | | | | |
|---|---|---|---|---|---|---|---|---|
| Fs(Hz)= | | | SOLUTION 2021 | | | | | |
| 666666.67 MCS index y(128) | Sequence *ovs (length) | FASWAM rate/Modulation | CP extension | FEC rate (coding) | RateVerif ratio/bps | Rate (data throughput, kpbs) | CIR_max |
| 0 | 128 * 2 | 1.0/TS2 | CP5 (⅙) | 0.5 | 0.083 | 434 | 96 |
| 1 | 128 * 2 | 2.0/TS4 | CP5 (⅙) | 0.5 | 0.167 | 868 | 48 |
| 2 | 128 * 2 | 3.0/TS8 | CP5 (⅙) | 0.5 | 0.250 | 1302 | 24 |
| 3 | 128 * 2 | 4.0/TS16 | CP5 (⅙) | 0.56 | 0.375 | 1953 | 24 |
| 4 | 128 * 2 | 3.0/TS8 | CP3 (⅙) | 0.667 | 0.500 | 2604 | 24 |
| 5 | 128 * 2 | 4.0/TS16 | CP3 (¼) | 0.667 | 0.667 | 3472 | 12 |
| 6 | 128 * 2 | 5.0/TS32 | CP3 (¼) | 0.667 | 0.833 | 4340 | 6 |
| 7 | 128 * 2 | 6.0/TS64 | CP3 (¼) | 0.667 | 1.000 | 5208 | 3 |

Range parameter defines the SS duration (size of building blocks), main packet structure and MCS pool definitions. The greater is the range, the better is the sensitivity and longer is the packet for the same content to transmit.

In different use cases, one or more of Range, PIM information and symbol index may be used in determining a SS sequence list to be used and what extension and Recipe of operations are to be performed. For example, controller 360 may determine configuration of modulation based on range only when there is a single or small number of users (e.g., less than a first user threshold) located at a close

TABLE 2

EXAMPLE DEF for $MCS_{p2}$ for PHR2 rat_str = 'FASWAM 3.0';
mtz_str = 'TS8'; % TimeShift 8-states
sym_str = '2*128'; % FASWAM SS/size
syr_str = 'CP3';  % GI copies: length3
cod_str = 'BCH(32,16)'; % FEC BCH-based Still with reference to FIG. 3, based at least on the MCS information, controller 360 configures an encoder 310 that receives an incoming bit stream, to perform adaptive coding and interleaving to transform incoming bits into symbols (e.g., K bits into X corresponding symbols).

The resulting symbols (e.g., X symbols) are provided from encoder 310 to a modulator 320. Controller 360, based at least on the MCS information, configures modulator 320 to perform a modulation of the incoming symbols using a given SS, namely a selected SS from the list of SS's (for the packet group) from a plurality of lists of SS's that are stored in a pool of sequences. In an embodiment, modulator 320 uses a selected SS (selected by controller 360 as described below) to modulate (a single) symbol. In an embodiment, this modulation is a circular shift of the selected SS.

As shown in FIG. 3, this pool of sequences may be stored in a memory 370. The pool of sequences may include a plurality of separate sequence lists $372_{1-n}$. These sequence lists may depend upon various parameters. Each sequence list may have a number of sequences, where each sequence can be defined from a vector of complex numbers, either in time or in frequency domain (before OFDM FFT).

In embodiments, the pool of sequences includes sets of SS that are predefined and/or computed, and which have good properties, in particular good auto-correlation and inter-correlation properties. In this way a SS and its circular-shift can be identified, having localized/peaky circular auto-correlation, and low circular inter-correlation with any shift of other SSs of sequence lists 372.

Variations in sequence lists 372 may be used to enable flexibility in packet communications to accommodate different numbers of simultaneous users. For example, different sequence lists having a same number of values (but differing values) can be used to provide concurrent or simultaneous transmissions to multiple users in an environment. And longer SS may be used for communications with more distant users within a wireless environment.

Depending upon implementation, the pool of sequences may be stored in a non-volatile memory where the pool is predetermined and stored as part of firmware. In other cases, the SS may be dynamically determined and stored, e.g., in a lookup table, or even generated 'on-the-fly' or dynamically, using the GCS/ZC equations described above.

In an embodiment, oversampled versions of predefined SS sequences can be saved in memory 370 to further optimize and pre-shape the signal. In some embodiments, a typical twice-rate definition (either in time or frequency) could be used as a basis for next modulation steps. Note that SSs can be selected to generate signals close to constant-amplitude modulations, and it is even possible to compress the final signal amplitude without modifying modem generic algorithms and without significantly reducing performance. In other embodiments, a subset of SS sequences can be stored in memory 370 (to reduce memory consumption) and then controller 360 can use these stored subsets to generate a complete sequence. For example, memory 370 may store a portion of a given sequence, and one or more processes may be applied to this stored sequence (e.g., symmetry: half-size and reverse to obtain a whole sequence). In addition, possible operations (e.g., conjugate), and/or filtering/resampling/FFT-OFDM may be performed to obtain a final SS used for a given SME.

In an embodiment, the SS selection may be based at least in part on a sequence size, which can be determined from range information, and may further be based on PIM2 parameters from the group information. In an embodiment, the range information may be used to obtain a list of SS (with defined size $N_{fft}$), and the PIM information (from group information) along with a symbol index may be used to select the SS from this list of SS.

Still with reference to FIG. 3, modulator 320 modulates a given symbol index with this SS, where selection of the modulation scheme can also be based on the MCS information.

Depending on implementation, the resulting SMEs can transmit information based on SSs using: shifts (time or frequency cyclic shifts of SSs); complex-multiplication (IQ) on the SS signal (including potential inversion, phase modulation, amplitude modulation); and different SSs over time. In some embodiments, shifts are considered for modulation only, to allow other dimensions to be used for PIM.

To simplify processing, choices can be made at early design stages. As an example, for one implementation a Sweep Scalable Simultaneous-access Wide-Area Network subset system is defined with a given modulation scheme that is based (only) on circular shifts of the SS. Amplitude modulation is not used (to keep PAPR low). Other degrees of freedom are not used to modulate information but to increase robustness through PIM techniques described below. In other words, potential further operations on the SS (including IQ processing like signal inversion, phase shift and drift, and SS variation or conjugation) can be used in combination with repetitions to leverage interferences and noises (instead of for modulating data information), allowing simple but efficient and future-proof receivers.

In turn, the group parameter extends the signature to manage PIM (defines scrambling and PIM indexes). In one embodiment, the group information may be mainly derived from previous exchanges (network association, previous packets) and/or previous portions of a packet (header containing fields that define the group selected for the next packet portion) provided within some part of a packet, and may be divided in two subsets, PIM1 and PIM2. The PIM1 parameter can be used to define an intra-SME Recipe (vector of operations for the given MCS depends on this PIM1 index). In turn, the PIM2 parameter can be used to define an inter-SME potential variation of the selected SS and/or Recipe (e.g., select the SS over the frame, such as a constant SS index or a repeated vector of SS indexes among the SS list to further scramble interferences).

The resulting modulated symbol is extended a selected number of times in an extender 332, and is provided to a Recipe operator 334 that applies a Recipe of operations on each copy of the modulated symbol. In embodiments, extender 332 may copy the modulated symbol a given number of times (e.g., based on MCS CPx, with recipe length of usually equivalent length, defined at least in part on PIM1 information). In various embodiments, Recipe operator 334 may be configured as a programmable processor, which can be implemented within or apart from modulator 320. Additional processing such as windowing, filtering or so forth may be performed in an optional edge processor 336. While in FIG. 3 separate extender, Recipe operator and edge processor are shown, in other cases a given modulator may include processing circuitry to perform all of these operations.

In embodiments, controller 360 determines this Recipe of operations based at least in part on the PIM1 information, which may be based at least in part on the group information of the information parameters. The resulting extended and modulated symbols may further be signal shaped within Recipe operator 330 (where this determination may be based on additional PIM1 information).

Referring now to Table 3, shown is an example of operations performed on a SS (for SME construction).

TABLE 3

| % * 0: nothing, | s(n)=cpx( I(n), Q(n)) |
|---|---|
| % * 1: inverse, | −s(n)=cpx(−I(n),−Q(n)) (negate values) |
| % * 2: rotatIQ, | js(n)=cpx(−Q(n), I(n)) |
| % * 3: rotIQinv, | −js(n)=cpx( Q(n),−I(n)) |

% Add 4 to conjugate: s*(n)=cpx( I(n),−Q(n))
% Add 8 to time-reverse: SS(n)<=SS(N-n), n=0,...N-1
% Add 16*D to apply NCO: SS(n)<=SS(n)*exp(j.Π.δ.n/N)
with δ={−1,1,−2,2,−0.5,0.5,−1.5,1.5} for D={1,2,3,4,5,6,7,8},
n=0,...N-1

Note that time-reversal instead of conjugation can help in phase continuity, and then decrease unwanted emissions (out-of-band spectrum regrowth) when filtering in the front-end. Although 144 operations are presented in this example, other sets of operations are possible in other embodiments, in particular extending the allowed values of delta for frequency shifts.

Referring now to Table 4, shown is an example of Recipe definitions for an example SME construction. As an example, for the 5 rows shown (which may be selected based on a PIM1 index), when the current MCS assumes 4 SS per SME ('CP3' like MCS{3-7} in Table 1), the values in Table 4 correspond to the listed operations to be performed on the SSs according to a given Recipe of operations.

TABLE 4

% if CP_nbSS == 4   % SME from 4 SS: Example of operation vector
    TAB_GID2_PIM1 = [
      0, 0, 0, 0; % [s s s s]
      0, 0, 1, 1; % [s s −s −s]   % Negative for the 2 last SSs of each SME
      0, 1, 0, 1; % [s −s s −s]   % Negate 1 SS over 2
      0, 3, 1, 2; % [s, −js, −s, js]
      0, 4, 1, 5; % [s, s*, −s, −s*]
      ... ]

Note that the processing and operations can be performed in the module/phase domains instead of I/Q quadrature domains (usual representation of complex values) through polar conversion; for constant amplitude targets, this could be implemented with phase modulators instead of IQ modulators. This process can simplify the phase continuity at edges.

As in OFDM, a circular time-shift of a SS is equivalent to a linear-varying phase shift in the frequency domain (with the DFT conversion of OFDM), which is, in the case of linear-frequency-sweeping SS, similar to a circular frequency-shift. A transmitter as well as a receiver may leverage this property to simplify demodulation and perform algorithms either in time or frequency.

With embodiments, robustness in real environments is improved, not only using the presented schemes (SS, PIM), but also considering sufficient minimal shifts between symbol depending on the Channel Impulse Response (CIR) (equaling echo spread), as presented in MCS tables.

Robustness and compromises in real channels (multipath and multi-user) can be increased using: cyclic-prefix-like extension of the signal (e.g., full repetitions of the signal, or at least large compared to conventional OFDM, which often considers only a small fraction of the symbol as a cyclic extension) to simultaneously handle channel spread/echoes and potential spreading groups coding over repetitions; variations of the selected SS, among the SS list, over time; and encoding and spreading at several levels. Such operations may avoid interference with similar packets, transmitted simultaneously in a real multi-user system.

A SWAM-modulated block is thus a succession of SME symbols where a SME is constructed from: a selected SS (with a given duration and sequence content); a modulation (i.e., symbol information to transmit; $1 \leq N \leq \log2(N_{fft})$ bits per SME); and a Recipe, i.e., the operator scheme over the SS repetitions (e.g., a vector of operations).

Embodiments may dynamically determine generation of a SWAM block to balance throughput and robustness (both in terms of range/SNR/echoes and interference capabilities). As discussed above, all of Range, MCS, PIM information and symbol index may be used. In this way, communications may target very low sensitivity, and leverage robustness, while still being efficient as it is flexible and scalable when the context permits smaller packets at higher throughputs. In one or more embodiments, SME and payload block construction process may be performed independently for each part of a frame communication (e.g., one or more headers and a data payload).

Still with reference to FIG. 3, the resulting SME is provided to an RF front end circuit 340 for various processing to result in an RF signal to be transmitted via an antenna 350. Although shown at this high level in the embodiment of FIG. 3, many variations and alternatives are possible.

Note that transmitter 300 may transmit a packet as a collection of frames, where there may be different frames for preamble, training field, header1, header2, and data (as an example). Each frame may have its own settings (defined from fixed/top-level common parameters and/or a previous frame). In turn a frame may be constructed with a given number of SMEs. Headers generally have a fixed and known number of SMEs for a given MCS. A data portion of a packet may be formed of a variable number of SMEs (each packet having different number of bits to transmit, where a data length is given in the headers).

In addition to the flexibility afforded by the above parameters, controller 360 also may enable greater reliability in difficult environments using sub-block interleaving. Thus in some implementations, an optional sample-subblock-level interleaving may be performed. Such interleaving may be performed to increase robustness in difficult channels with potential varying-over-time noises and interferences (e.g., localized/peaky or impulsive noises). This interleaving is performed on the samples of each SME over the packet, as it is often too late at bit-level to deinterleave information that is already poisoned by localized high-level noises that give high but wrong reliabilities to a given symbol at the receiver.

Thus to provide additional robustness, optional sample-subblock-level interleaving may be performed to spread 'sample-level information' over a packet by splitting each SME into P subblocks. In one or more embodiments, this optional feature can be activated on a per packet basis (e.g., via a bit field option in a header of each packet) or fixed by the network or from a design choice for a given application.

Figure 4:
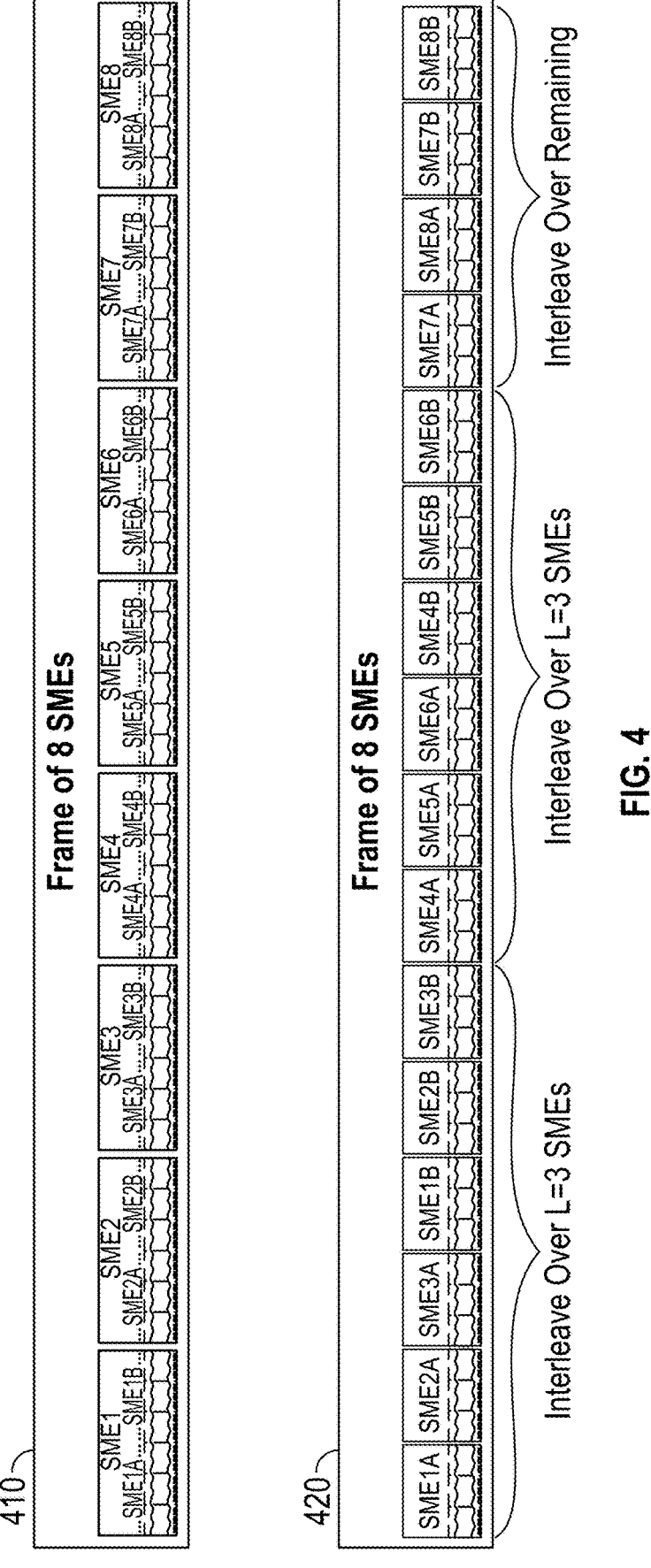
FIG. 4 is a block diagram illustrating representative frames in accordance with an embodiment.

Referring now to FIG. 4, shown is a block diagram illustrating representative frames in accordance with an embodiment. First, a frame 410 is illustrated without interleaving. In this example, frame 410 is shown having SME symbols (each symbol with a MCS CP5, i.e., 6 SS 'copies' per SME) and a sub-block length of SME length/2 (P=2). As shown, without interleaving frame 410 is generated and transmitted with each SME symbol contiguous (the split into two sub-blocks each of 3 SS is not requested). In turn, frame 420 is illustrated with interleaving activated.

In the example shown, frame 420 has a configuration with a simple spread over 3 SMEs to generate and send information with a simple interleaving of SME1A, SME2A, SME3A, SME1B, SME2B, SME3B, SME4A, SME5A, SME6A, SME4B, SME5B, SME6B, SME7A, SME8A, SME7B, SME8B. As seen, the first operation is to group per block of L SME (where L=3 here), with the last block for a given frame length being of size between 1 and 3. And the second operation is a simple reshaping/reordering per P sub-blocks, where P=2 here, that splits each SME into P parts equally interleaved within the frame.

The optional features to split into sub-blocks in time or in frequency (e.g. interleave in time SMEs as presented on FIG. 4; and interleave in frequency and consider recipes with high-values of frequency-shifts and low-values of U sweeping slopes in SS) can allow to further improve performance with more advanced receivers in specific environments that have more localized noises and interferences.

In general, demodulation of received packets may proceed in a reverse fashion to transmission, based on information parameters as discussed above (including Range/MCS and Group). Depending on implementation, this information may be fixed (e.g., standard/network/negotiated), or based on information obtained in a previous part/frame of a packet (e.g., to refine MCS and group information progressively). Once an initial packet detection and synchronization process is performed, the information parameters may be used to perform demodulation of each SME as follows.

First, the SS and Recipe of operations as used on the transmitter side to modulate symbols may be determined based on the information parameters and symbol index. Note that there can be a potential combination of several subparts of SME. In general, the operations performed on the transmit side may be performed in reverse order, i.e., potential edge processing (e.g., windowing/removal/weighting) may be performed, then a reverse Recipe of operations is performed, and finally the resulting SSs of the SME are aggregated to form only one received "denoised" SS.

Once the SS is recovered, it is processed either in frequency (after a FFT operation) or in time. Then a correlation is performed with an expected SS to find a most probable modulation. In a frequency domain, the cyclic correlation of sequences is equivalent to a dot product of their Fourier transform (after complex conjugation or time-reversal of one sequence). In this operation, a symbol shift can be easily derived from analysis of an inverse FFT (IFFT) operation on this correlation.

To understand, in an example without cyclic-shift (modulation0), the correlation of a sequence with itself (conjugate) results in a flat sequence in phase/angle (and even is a sequence of 1 if the SS has complex values of module 1 like CAZAC sequences), related to an IFFT with a peak in index 0 (frequency shift=0). For Sweep-Sequences, the higher the modulation shift is at a transmitter, the more cycles of sinusoids are present in a correlation vector, resulting in a related FFT with a peak at an increased index that gives an initial modulation cyclic shift. This cyclic shift is used to find/estimate the most probable transmitted cyclic shift among the $2^M$ symbols, or to derive soft values of probabilities (reliabilities) for each potential $2^M$ symbols in a very noisy reception environment.

This process may proceed in a loop as long as there are more symbols to process. Then, the most probable transmitted bits are deduced from a soft processing (similar to soft-FEC decoding) on the previous soft values per symbol, as a reverse operation of the transmit BIC operation to provide the transmitted bitstream.

In other embodiments, a different receiver may be used to improve performance. As an example, knowing/estimating CIR, especially in case of channel echoes, principles similar to a rake receiver can be used to better recombine echoes with adequately corrected correlations on several main paths. Note that receiver algorithm simplifications may occur in case of linear-frequency-sweep sequences.

Figure 5:
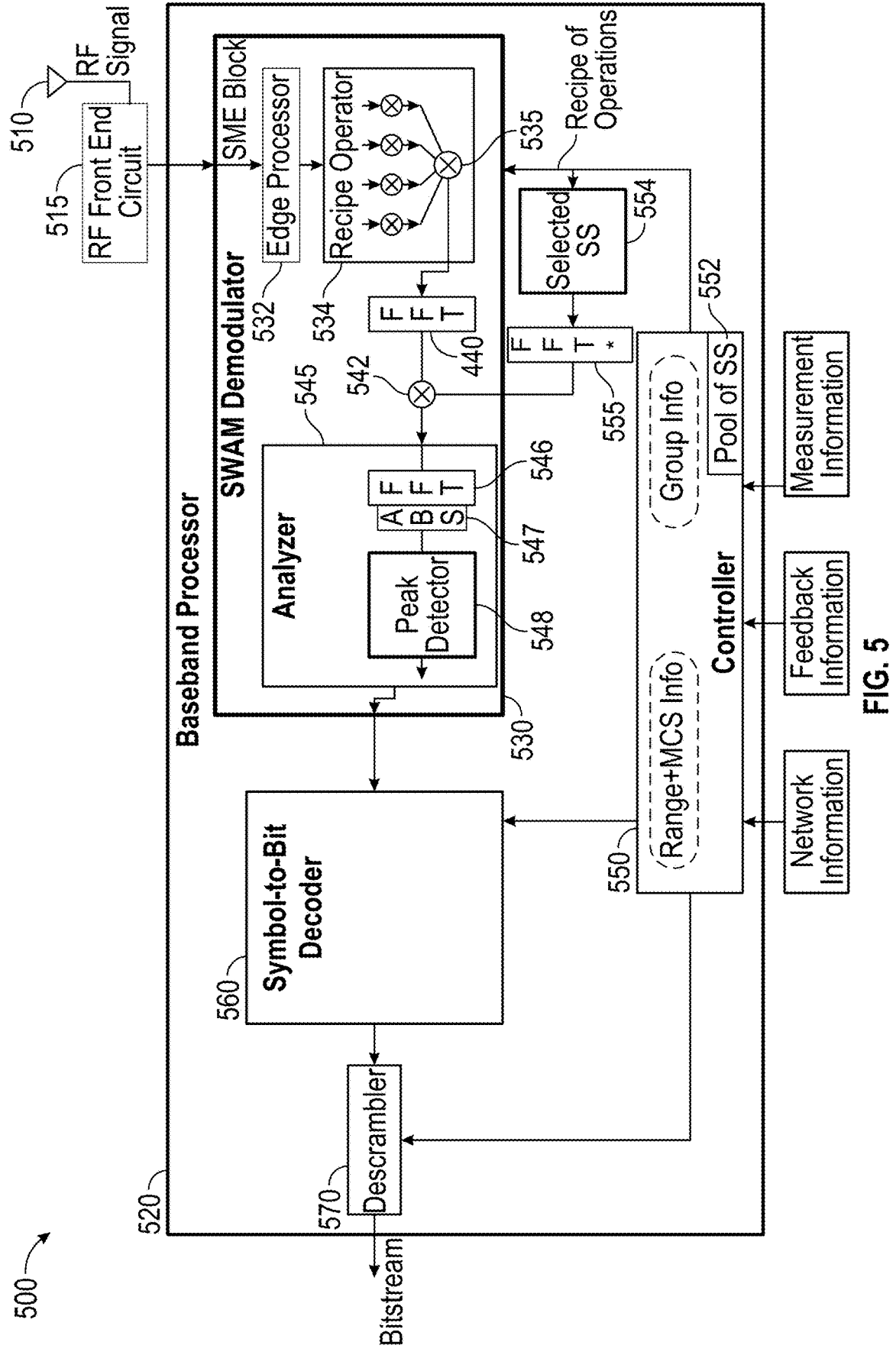
FIG. 5 is a block diagram of a receiver in accordance with an embodiment.

Referring now to FIG. 5, shown is a block diagram of a receiver in accordance with an embodiment. As shown in FIG. 5, receiver 500 is configured to receive and demodulate information using a SWAM demodulator as described above. Although shown as a separate circuit, in some cases, a transmitter and receiver can be implemented as a transceiver in a single device (and may share at least some common circuitry).

As shown, incoming RF signals are received via an antenna 510 and provided to an RF front end circuit 515. Front end circuit 515 may perform various RF processing, including amplification in a low noise amplifier, filtering, downconversion and digitization. In turn, resulting digital information, e.g., at baseband, is provided to a baseband processor 520.

Baseband processor 520 may perform various preparatory processing before providing resulting SME's to a SWAM demodulator 530. As shown, demodulator 530 is configured to perform a reverse set of operations as performed in a modulator on the transmit side. The selection of operations and configuration of demodulator 530 may be performed under control of a controller 550, which may determine an appropriate configuration of demodulator 530 to perform demodulation based at least in part on the information parameters, including Range, MCS information and Group information, as discussed above. Depending on implementation, this information may be received as one or more of network information, feedback information, and/or measurement information. Based on at least some of the information parameters, controller 550 may determine an appropriate reverse Recipe of operations to perform on incoming SME block to enable recovery of a given symbol as well as to determine whether shaping operations including edge processing, window and filtering or so forth is to occur. Controller 550 may be a programmable hardware circuit that is configured to execute instructions such as may be stored in one or more non-transitory storage media.

As shown, SME blocks are provided to an optional edge processor 532 to perform any edge processing, windowing or filtering as indicated under control of controller 550. Thereafter the SME blocks are provided to a Recipe operator 534, which may perform a reverse Recipe of operations on the SME block, as instructed by controller 550 to recover original SSs. Thereafter, via combiner 535 the separate SSs are aggregated into a single denoised SS.

In turn, this SS is provided to a FFT engine 540 for transformation to the frequency domain. Understand while shown in FIG. 5 as being processed in the frequency domain, in other cases the recovered SS may be processed in the time domain.

The frequency domain SS (in the form of a plurality of subcarriers) is provided to a correlator 542 for execution of a correlation as a dot product operation between an incoming SS and the conjugate of selected SS 554 (transformed into the frequency domain via FFT engine 555). Note that controller 550 may select selected SS 554 from a pool of SS 552 based on the information parameters (e.g., Range, Group).

Still with reference to FIG. 5, correlation results are provided to an analyzer 545. As shown, analyzer 545 can include an IFFT engine 546 to identify the number of cycles in the correlation vector corresponding to a modulation/shift. Thereafter, in one simple embodiment, an absolute value of the correlation results may be obtained in an absolute value operator 547. Thereafter, the values are processed in a peak detector 548 to identify a maximal correlation value to identify a given symbol. In the FIG. 5 implementation, analyzer 545 is a very simple hard decision analyzer (as shown), however a soft decision analyzer may be used in other implementations (such as described in the context of FIG. 6). Also note that while FIG. 5 shows an implementation with a dot product and max operation, in other embodiments progressive capabilities may be provided for advanced algorithms for more advanced/powerful receivers.

In turn, this symbol is provided to a symbol-to-bit decoder 560 to output information bits that are then provided to an optional descrambler 570. Descrambler 570 may descramble the information bits to result in a bitstream that can be provided for further processing within baseband processor 520 or another location within a receiver. Understand while shown at this high level of FIG. 5, many variations and alternatives are possible.

Referring now to FIG. 6, shown is a flow diagram of a method in accordance with another embodiment. As shown in FIG. 6, method 600 begins by receiving and processing an RF signal that includes a packet (block 610). This processing includes amplification in a low noise amplifier, filtering, (optional) additional gain control and so forth, down conversion to a lower frequency signal, and digitization to obtain a digitized signal. Next at block 620, various information parameters associated with the packet may be obtained. These information parameters may include range, MCS and group information as discussed above.

Still with reference to FIG. 6, at block 625 a SS and a reverse Recipe of operations may be determined based on the information parameters and symbol index. At least some of this information (and also measurements) also may be used to determine whether additional processing, e.g., edge processing is to be performed. At this point, the digitized signal may be processed, beginning with optional edge processing in optional block 630.

Next at block 650 the determined reverse Recipe of operations may be performed on modulated symbols of the SME. An aggregation process then is performed at block 660 to aggregate the processed modulated symbols to result in a single SS. Note that the processed modulated symbols may present different levels of reliability (or equivalent SINR), especially if interleaving options are activated (sub-blocks spread in time and/or frequency); then, advanced receivers could detect/measure this to weight the processed modulated symbols before aggregating them to a single SS.

Thereafter at block 670 a correlation may be performed between the single SS and a selected SS. In this way, soft estimations for the symbol are obtained, also termed "symbol-likelihood-values," as in some cases a soft decision analysis may be more optimal to provide more/accurate soft information to a symbol-to-bit decoder (such as decoder 560 of FIG. 5). As used herein, note that these processed decisions may be referred to generically as "symbols," whether they are hard decisions or soft estimations (symbol-likelihood-values "), since depending on implementation hard decisions or likelihood values can be output.

Then it may be determined at diamond 670 whether more symbols are present. If so, control passes back to block 630, discussed above. After multiple symbols have been obtained, control passes to block 680 where these soft estimations may be processed to obtain a set of information bits. In this process, given the spreading of information over multiple SMEs, several soft decisions from several symbols may be processed to properly deinterleave (if needed) and decode (in an FEC decoder) them to obtain the final information bits. Thus in the embodiment of FIG. 6, several reliability/soft-decision values are provided, comparing each received symbol with all potential ($2^M$) symbols, to have all the information and be able to take the best decision in the decoder. These information bits may be output as a digital bitstream for further processing (block 690). Although shown at this high level in the embodiment of FIG. 6, many variations and alternatives are possible.

In one embodiment, the correlator and analyzer processing may be done in time from the received and expected sequences. One or several correlations or part of correlations (per block), with one or several circular shift and filtering of one of the sequences (received or expected, one of them being generally conjugated before the operation), provide enough information to the analyzer to perform the symbol detection or the delivery of (generally $2^M$) symbol-likelihood-values for each received SME. These symbol-likelihood-values can be seen as real values measuring the probability that the received symbol is equivalent to each of the $2^M$ potential symbols; the higher is the better. The soft-decoding (reverse FEC) can advantageously benefit from this information to provide the most probable bitstream.

In another embodiment, the correlator processing may be done in frequency from the received and expected sequences. One or several correlations, dot product or part of it, with one or several circular shift and/or filtering of one of the sequences (received or expected, Fourier-transformed, one of them being generally conjugated before the operation), provide enough information to the analyzer to perform the symbol detection or the delivery of (generally $2^M$) symbol-likelihood-values for each received SME.

In another embodiment, the correlator processing may be done in frequency and in time from the received and expected sequences. One or several correlations, dot product or part of it, with one or several circular shift and/or filtering of one of the sequences (received or expected, Fourier-transformed, one of them being generally conjugated before the operation), can be done to estimate the most probable modulation shifts. Then, another processing, in frequency or in time, from the same received and expected sequences with additional processing (circular shifts, filtering), can refine the estimation of correlation probabilities around the expected shifts (up to $2^M$ potential symbols) to provide enough information to the analyzer to perform the symbol detection or the delivery of (generally $2^M$) symbol-likelihood-values for each received SME. This extra processing can also be used to track the TX-to-RX drift, i.e., synchronization derives, to correct the receiver algorithms and/or potentially adjust its clocks.

In one embodiment, as a simple and robust solution, the analyzer can search for most probable shifts or symbol-likelihood-values using the absolute values of the FFT of correlation(s) (without considering the phase). This is a robust solution to provide values without needing accurate synchronization nor tracking.

In another embodiment, as an algorithm improvement, the analyzer can consider the complex-valued FFT/correlation (s), and potentially previous phase estimation, to decrease its equivalent noise in correlation (projection on a given phase of the noise can divide by a factor 2 the equivalent noise after correlation).

In another embodiment, as another algorithm improvement, the analyzer can consider several times the previous processing, like a Rake-receiver, after the estimation of several relevant paths (CIR) in a channel with strong echoes. Such a multipath environment detected in previous synchronization steps or from the tracking process, can trigger this extra processing to still improve performance in these most difficult channels.

Note that in case of linear-sweep SS, optimizations for efficient demodulation can be done replacing intensive Rake processing by simpler filtering, as the CIR appears in correlations steps; allowing several designs of low-power low-cost receivers with good performance.

To improve performance while keeping a rather low processing complexity, the Maximum-Ratio-Combining principle can then be applied on main channel paths (CIR), but also on the recombination/aggregation of subblocks of SMEs especially if interleaving principles are considered in the modulation. Over the whole duration and bandwidth of the SME, if SME is split in P subblocks in time (see interleaving of FIG. 4) and N subblocks in frequency (considering N=CPx+1 repetitions of narrow sweeps and recipes with NCO moving the SS over frequency blocks), receiver algorithms can advantageously weight these subblocks before their aggregation, to mitigate the effects of localized interferences on the single denoised SS.

In one embodiment, to further improve performance (including increase coverage while preserving the wireless resource limiting retransmissions, also allowing measurements among the gateways to select the best one(s) for each user), in a network where several Gateways receive the transmitted packet in uplink transmissions, the symbol-likelihood-values for each received SME of a given packet can be generated at each Gateway. These values are then sent to a centralized server that will optimally gather and decode this soft-information to provide the final bitstream.

Figure 7:
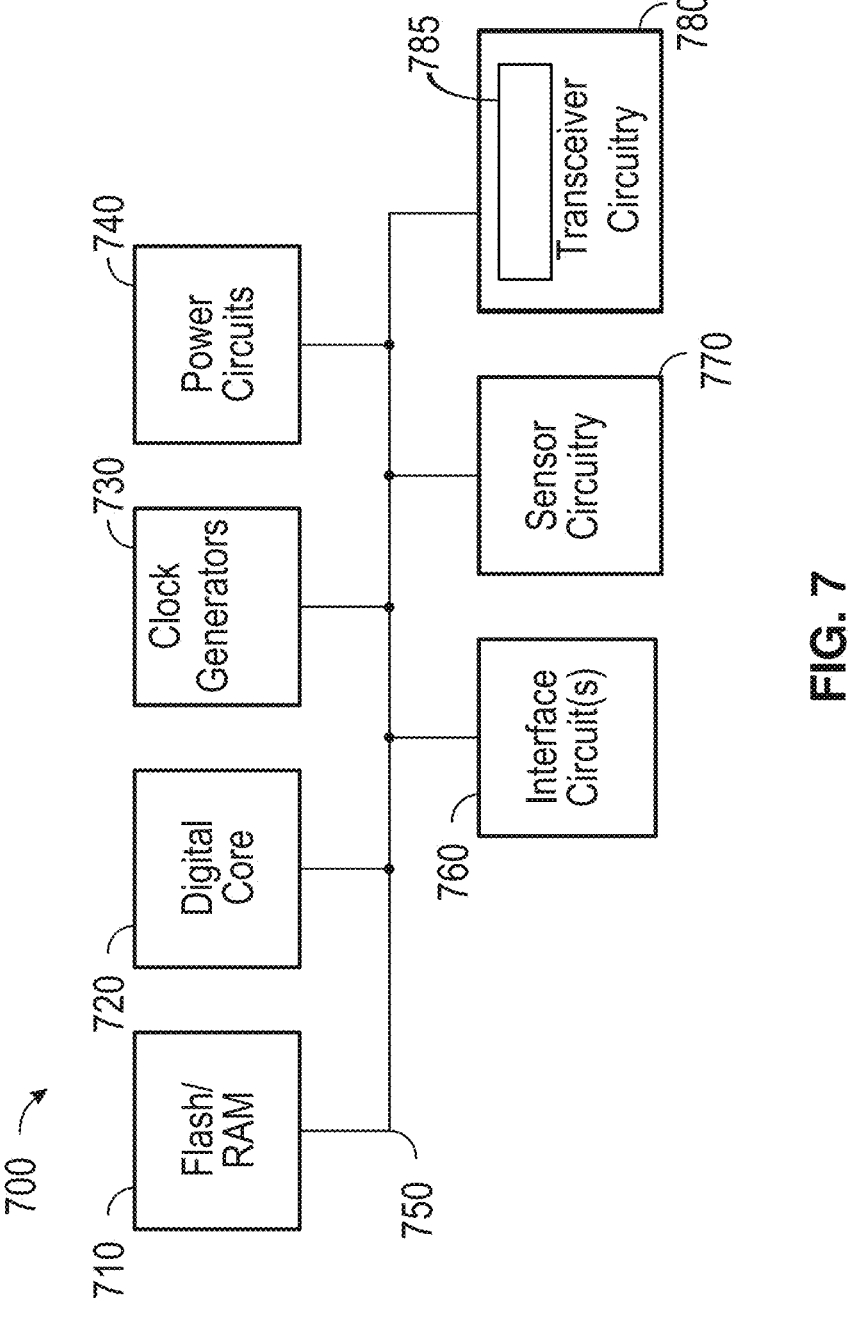
FIG. 7 is a block diagram of a representative integrated circuit that incorporates an embodiment.

Embodiments may be incorporated into many different types of wireless systems. Referring now to FIG. 7, shown is a block diagram of a representative integrated circuit 700 that includes transceiver circuitry to perform SWAM modulation and/or demodulation as described herein. In the embodiment shown in FIG. 7, integrated circuit 700 may be, e.g., a microcontroller, wireless transceiver that may operate according to one or more wireless protocols (e.g., WLAN-OFDM, WLAN-DSSS, Bluetooth, 802.15.4, among others), or other device that can be used in a variety of use cases, including sensing, metering, monitoring, embedded applications, communications, applications and so forth, and which may be particularly adapted for use in an IoT device, particularly over longer ranges and in simultaneous user contexts.

In the embodiment shown, integrated circuit 700 includes a memory system 710 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions, including instructions for transmitting and receiving packets having SWAM modulation characteristics as described herein.

Memory system 710 couples via a bus 750 to a digital core 720, which may include one or more cores and/or microcontrollers that act as a main processing unit of the integrated circuit. In turn, digital core 720 may couple to clock generators 730 which may provide one or more phase locked loops or other clock generator circuitry to generate various clocks for use by circuitry of the IC.

As further illustrated, IC 700 further includes power circuitry 740, which may include one or more voltage regulators. Additional circuitry may optionally be present depending on particular implementation to provide various functionality and interaction with external devices. Such circuitry may include interface circuitry 760 which may provide interface with various off-chip devices, sensor circuitry 770 which may include various on-chip sensors including digital and analog sensors to sense desired signals, such as for a metering application or so forth.

In addition as shown in FIG. 7, transceiver circuitry 780 may be provided to enable transmission and receipt of wireless signals according to one or more of a local area or wide area wireless communication scheme, including SWAM modulations as described herein. As shown, transceiver circuitry 780 includes a PA 785 that may transmit RF signals having packets formed of frames including modulated SMEs as described herein. Understand while shown with this high level view, many variations and alternatives are possible.

Note that ICs such as described herein may be implemented in a variety of different devices such as an IoT device. This IoT device may be a smart utility meter for use in a smart utility network, e.g., a network of stars or gateways in which long-range communication is according to an IEEE 802.15.4 specification or other such wireless protocol.

Figure 8:
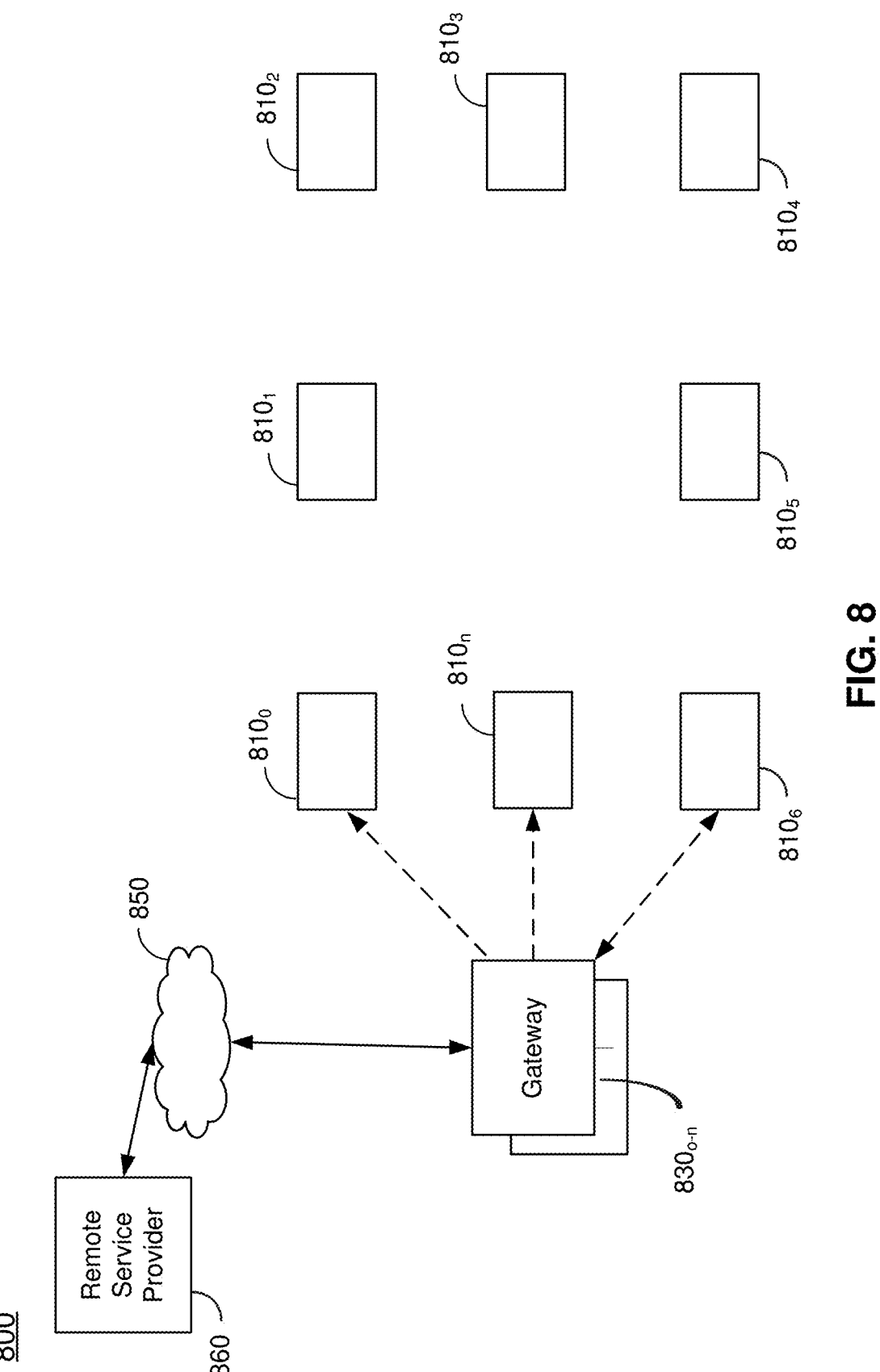
FIG. 8 is a high level diagram of a network in accordance with an embodiment.

Referring now to FIG. 8, shown is a high level diagram of a network in accordance with an embodiment. As shown in FIG. 8, a network 800 includes a variety of devices, including wireless devices such as IoT devices, gateways and remote service providers. In the embodiment of FIG. 8, a network of stars may be present in a long range environment having multiple IoT devices 810$_{0-n}$. Such IoT devices may generate and process packets having SME modulated symbols as described herein. Each IoT device 810 may couple to one or more gateways 830$_{0-N}$ that in turn communicate with a remote service provider 860 via a wide area network 850, e.g., the internet. In an embodiment, remote service provider 860 may include network and application servers. Understand while shown at this high level in the embodiment of FIG. 8, many variations and alternatives are possible.

As an example, RANGE0 and GROUP0 parameters could be fixed between end node device and gateway (with a default highest range mode and group 0 at initialization/reset, and default values known after the device is registered and associated with this network). RANGE0 could have 4 sequence sizes for instance. GROUP0 could use the sequence in one direction or in the other (i.e., apply a conjugate operator or not); band selection also extends these groups. Gateways listen to all RANGE0 and GROUP0 modes, enabling quasi-orthogonal simultaneous packets.

An end node device (e.g., one of IoT devices 810) generally listens only for its selected RANGE0 and GROUP0$_{DL}$ mode in its assigned band, at given instants, to minimize complexity and power usage. Then, RANGE1 and GROUP1 parameters may also be defined, but be more variable and defined at each transmitted packet to scale and adapt. RANGE1 could be defined from a preamble and/or header to help in further scaling the packet in range, i.e., length/rate (to refine range and MCS). GROUP1 could extend the distinction between networks/services/IDs/groups to help in further scaling in density, e.g., limiting the interference between different packets (of different networks), and stopping receiver processing as soon as possible if the packet need not be decoded in a given receiver.

In various embodiments, different SSs and Recipes can be used not only for each frame (depending on frame and group) but also for each SME index (generally looping over a given sub-list of SSs and Recipes as presented above). The main goal of such variations is to mitigate the interferences between similar SWAM packets. Instead without an embodiment where there are no variations (typically the case in conventional standards and long-range solutions), several packets sent at the same time would interfere and impair receipt, such that a global system could quickly go down with an escalation of retransmissions.

Embodiments thus provide flexible modulation/demodulation that is scalable (and customized to cope with given applications without compromising simple and efficient reception, keeping the expected properties), providing sufficient degrees of freedom and algorithms to exploit these signal properties.

With the aforementioned design choices, as throughput mainly depends on Range and MCS parameters (sequence length, SS to SME repetitions, number of shift states per SS, FEC coding scheme) and PIM capabilities depend on other parameters (number of operation combinations per SME over the SS to SME repetitions, SS list size, potential extra SME basis rotation), the system is rather flexible and scalable to adapt to many long-range applications. Trade-offs also are possible to increase either user throughput or robustness with many simultaneous users.

In a long-range network, packet transmission may occur with a random access, i.e., unslotted/unmanaged, such that any device can send non-synchronized packets, e.g., in an uplink direction. Embodiments enable scalability in packet generation to be efficient on a wide range of scenarios.

In some embodiments, packet structure may be similar to a IEEE 802.15.4g Wireless Smart Utility Network (WiSUN)-orthogonal frequency division multiplexing (OFDM)-based packet, with variations to ensure scalability.

In an embodiment, the packet is formed with: a preamble having a variable length that is used for detection, where the length scales with a generally repeating known sequence; next further training fields allow finer synchronization (in frequency and time) and also blindly deliver information to detect a range mode to scale the packet accordingly; thereafter scalable header fields may be split into multiple parts to optimize packet duration and start mitigating packet interference as soon as possible, with several Groups so that several concurrent packets do not interfere too much (also enabling to stop demodulation as soon as possible, if decoding fails or user group is different); and finally a data portion is provided that also may have a variable length.

This progressive scalability in rate and in groups to reduce interference enables efficient reception of the data portion of the packet for a targeted application.

Each frame part is defined from 3 parameters {Range R, MCS M and Group G}. The progressive refinement of these parameters over a packet is a key to efficiently scale and preserve robustness. Each packet portion (e.g., PHR1, PHR2, DATA) is formed of a plurality of SME symbols, where each SME is constructed from an SS sequence and Recipes of operations.

Consider an example of a high-level choice to customize settings based on network requirements and environment, allowing to define for each packet these 3 parameters of (Range R, MCS M and Group G). These 3 parameters enable customization of packets and to adapt SWAM modulation with a given list of SSs (all SSs may be configured to have the same length for a given Range), given lists of Recipes (customized from MCS and Group), and with given potential variations of the Recipes over the frame to further improve packet-interference mitigation.

Just to provide an example of packet structure and duration for the main Ranges RGS, Table 5 below shows example customizations. As shown, in a 500 kHz Bandwidth configuration, shortest range signals could be based on SUN-OFDM option2, and longest-range signals target the worst-case with a sensitivity down to −130 dBm and large channel echos. This long-range case corresponds to lowest data rates of 400 bits per second; while highest rates can reach SUN-OFDM data rates with tens of kilobits per second.

TABLE 5

| | | | | 8 Ranges ($R_i$) for scalable packet structure (duration & rates) | | |
|---|---|---|---|---|---|---|
| RGS | Range level $R_i$ | Short Training Field (STF) duration | Long Training Field (LTF) mode/duration | Packet Header 1 (PHR1) modes (MCS/duration) | PHR2 modes (MCS/duration) | DATA modes |
| 0 | $0_{SUN\text{-}OFDM2sensi}$ | 0.48 ms $_{(-113\ dBm)}$ | | or could consider SUN-OFDM option2 (i.e. SWAM $R_i > 0$ as an extension of WiSUN). | | |
| | 1 | 0.96 ms $_{(-116\ dBm)}$ | 0: 1.536 ms (s64 up) | 0: MCSp3 (s64, TS8, CP3)*5 ⇒ FEC 0.313 1.920 ms | 1: MCSq6 (s64, TS8, CP3)*10 ⇒ FEC 0.533 3.840 ms | f(MCS): 1.7 to 17 kbps |
| 1 | 2 | 1.92 ms $_{(-119\ dBm)}$ | 1: 3.072 ms (s64 dn) | 1: MCSp2 (s64, TS4, CP3)*8 ⇒ FEC 0.330 3.072 ms | 2: MCSq5 (s64, TS4, CP3)*15 ⇒ FEC 0.533 5.760 ms | f(MCS): 0.8 to 10.4 kbps |
| | 3 | 3.84 ms $_{(-122\ dBm)}$ | | | 3: MCSq4 (s64, TS4, CP3)*16 ⇒ FEC 0.500 6.144 ms | f(MCS): 0.8 to 10.4 kbps |
| 2 | 4 | 7.68 ms $_{(-125\ dBm)}$ | 2: 6.144 ms (s128 up) | 2: MCSp1 (s128, TS8, CP3)*5 ⇒ FEC 0.313 3.840 ms | 4: MCSq3 (s128, TS8, CP3)*10 ⇒ FEC 0.533 7.680 ms | f(MCS): 0.8 to 10.4 kbps |
| | 5 | 11.52 ms $_{(-127\ dBm)}$ | | | 5: MCSq2 (s128, TS8, CP3)*11 ⇒ FEC 0.485 8.448 ms | f(MCS): 0.8 to 10.4 kbps |
| 3 | 6 | 15.36 ms $_{(-128\ dBm)}$ | 3: 12.288 ms (s128 dn, extended recipes ON) | 3: MCSp0 (s128, TS4, CP3)*8 ⇒ FEC 0.330 6.144 ms | 6: MCSq1 (s128, TS4, CP3)*16 ⇒ FEC 0.500 12.288 ms | f(MCS): 0.4 to 5.2 kbps |
| | $7_{Longer\text{-}Range/sensi}$ | 23.04 ms $_{(-130\ dBm)}$ | | | 7: MCSq0 (s128, TS4, CP3)*18 ⇒ FEC 0.444 13.824 ms | f(MCS): 0.4 to 5.2 kbps |

This flexibility to ensure a scalable system, customized to the network needs, to balance the efficiency in terms of Range, throughput, number of simultaneous users per gateway, and so forth. Robustness is enabled using SWAM modulation and configurable packets in accordance with an embodiment.

Figure 9:
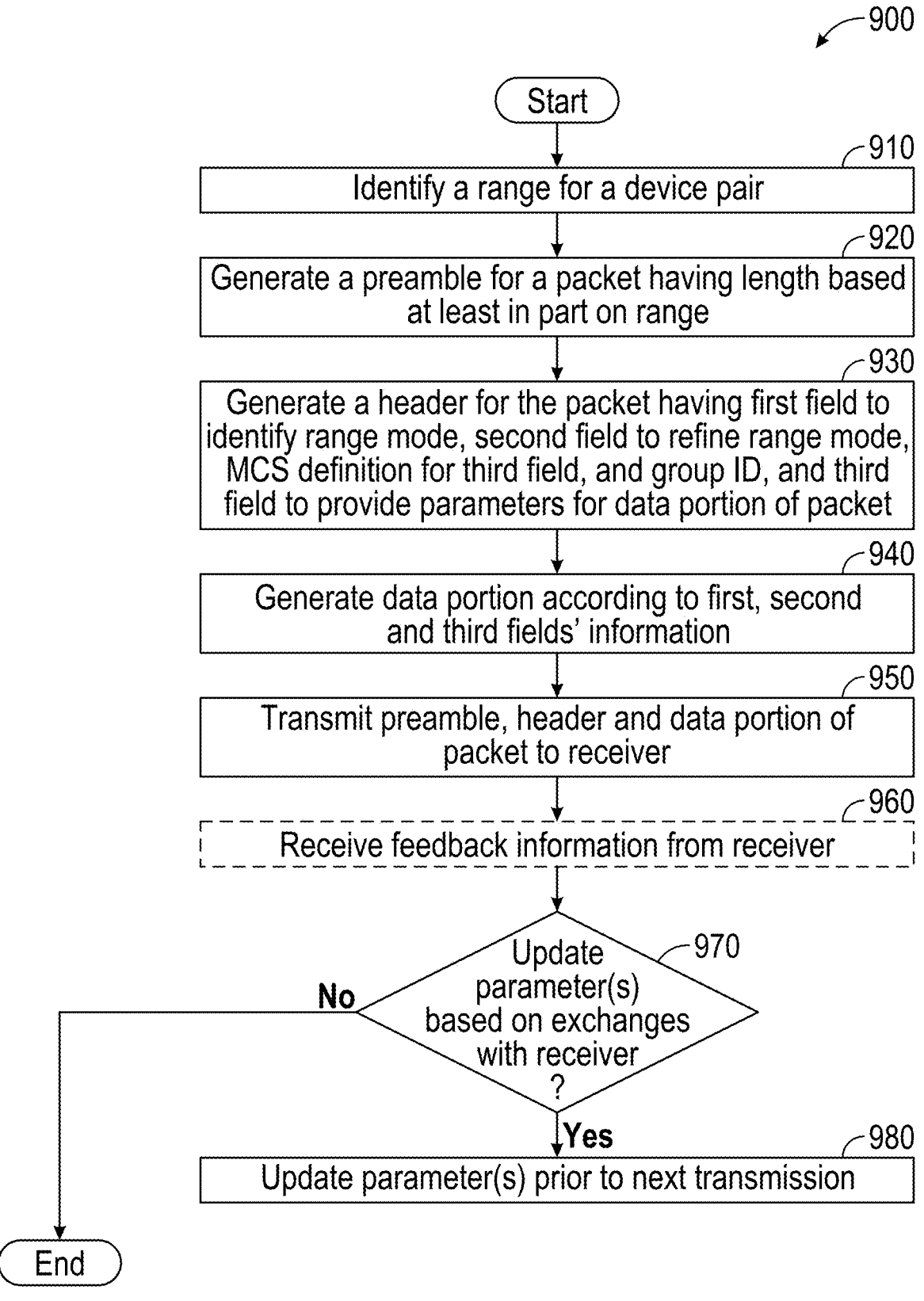
FIG. 9 is a flow diagram of a method in accordance with an embodiment.

Referring now to FIG. 9, shown is a flow diagram of a method in accordance with another embodiment. More specifically, as shown in FIG. 9, method 900 is a method for generating and transmitting packets having SWAM modulation and controllable preamble and header fields in accordance with an embodiment. As such, method 900 may be performed by a controller of a transmitter, including hardware circuitry such as within the transmitter shown in FIG. 1, alone and/or in combination with firmware and/or software. In such embodiments, the hardware circuitry is configured to execute instructions stored in one or more non-transitory storage media.

While described as "transmitter" and "receiver," understand that the operations performed on this transmit side can be performed by gateways, access points or so forth, as well as stations. In any case, understand that both transmitters and receivers may be part of devices that have transceiver functionality and thus, both can transmit and receive information.

As illustrated, method 900 begins by identifying a range for a device pair, namely a pair of devices in communication, including a transmitter and a corresponding receiver (block 910). Depending upon implementation, this range may be identified based on previous link parameters. Still further, the range may be adapted if necessary, e.g., over multiple packets. Thereafter at block 920, a preamble is generated for the packet. This preamble may have a length based at least in part on the identified range.

Still referring to FIG. 9, next at block 930 a header is generated for the packet. Although various implementations are possible, as illustrated in FIG. 9, this header may have at least three fields. The first field may be used to identify a refined range mode, the second field may be used to still refine the range mode (optionally) and provide an MCS definition for following fields, as well as to provide a group ID. The third field may provide parameters for a data portion of the packet. Still further, understand that this third field may further potentially refine one or more of an MCS definition and a group ID for the following data portion.

Thereafter at block 940, the data portion of the packet may be generated according to various information present in one or more of the first, second and third fields. Next at block 950, the packet is transmitted (to the receiver(s)) with all of the preamble, header and data portions.

Still with reference to FIG. 9, at optional block 960 feedback information may be received from the receiver. Although embodiments are not limited in this regard, this feedback information may include signal quality information, updated parameters or so forth, and/or downlink data (information from the network to the device) may also be received. Next at diamond 970, it may be determined whether one or more parameters are to be updated based on the measurements and the exchanges with the receiver. If not, no further operations occur.

Otherwise, when it is determined to update parameters, control passes to block 980 where such one or more parameters may be updated based on the exchanges between devices. Such exchanges may include measurement information, feedback information, communication of packets indicating modification to the parameters or so forth. Understand while shown at this high level in the embodiment of FIG. 9, many variations and alternatives are possible.

Referring now to FIG. 10, shown is a flow diagram of a method in accordance with another embodiment. As shown in FIG. 10, method 1000 may be performed by hardware circuitry such as the receiver shown in FIG. 6, alone and/or in combination with firmware and/or software. In such embodiments, the hardware circuitry is configured to execute instructions stored in one or more non-transitory storage media.

As illustrated, method 1000 begins by receiving a preamble of the packet in the receiver (block 1010). Next at block 1020, correlations may be performed to detect the preamble. In an embodiment, time shifting correlations may be performed on the preamble, which as discussed above includes repetitions of a sequence, enabling simple but efficient packet detection. A similar processing in the frequency domain (using FFT) is also possible.

Next at block 1030, the detection may be validated based on the end of preamble. In an embodiment, this detection process may include multiple correlations with varying preamble signals (including signal inversions, conjugation, etc.) or other known operations on the sequence repetitions to validate the signal in a noisy environment. Thereafter at block 1040, the receiver may be synchronized and a range mode identified, e.g., based on a first field of the header. Next, the range mode may be refined (optionally) and a group identified based on a second field of the header (block 1050). Still further, at block 1050, an MCS definition may optionally be refined for the following fields.

Next at block 1060, various parameters for a data portion of the packet may be determined based on first, second and third fields of the header. For example, this information may identify a data length and an optional refinement of MCS definition for the data portion. Finally at block 1070, data of the data portion may be demodulated based at least in part on these parameters.

Figure 11:
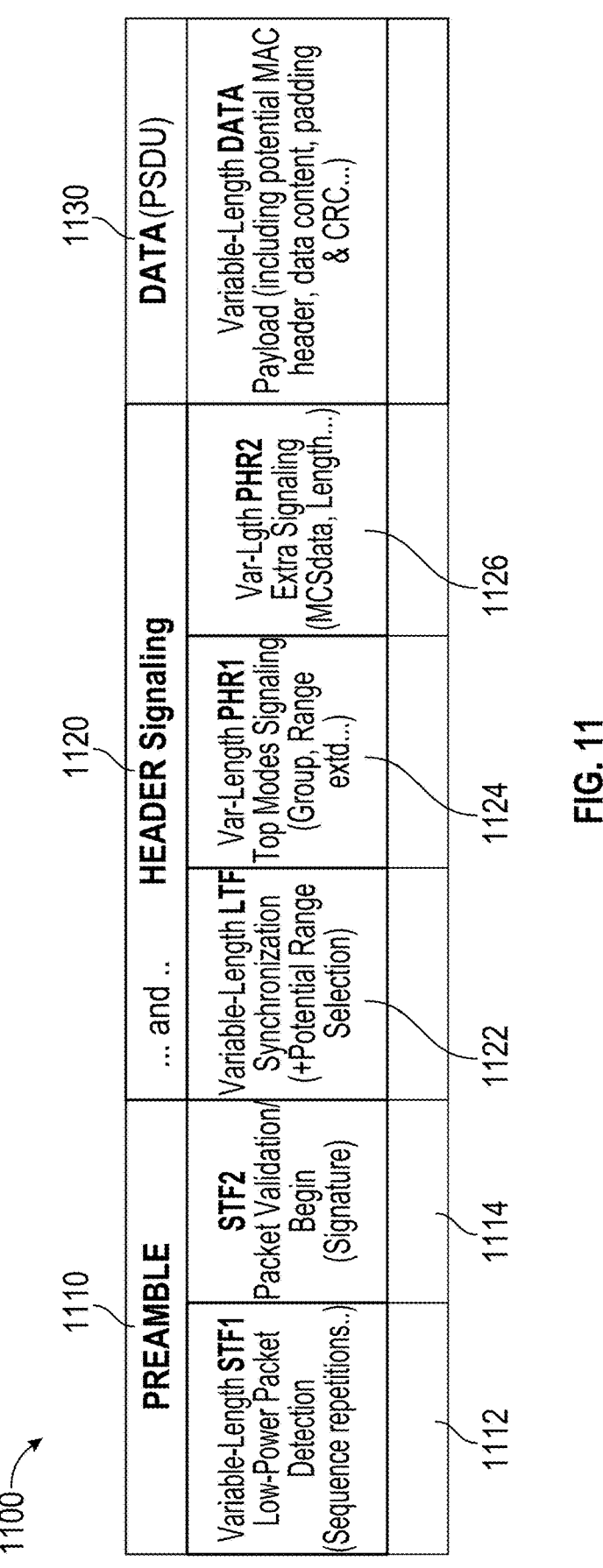
FIG. 11 is a block diagram of a scalable packet in accordance with an embodiment.

Referring now to FIG. 11, shown is a block diagram of a scalable packet in accordance with an embodiment. As shown in FIG. 11, packet 1100 is scalable in that its various portions (preamble, header and data portion) can include one or more fields having variable length depending on parameters including range, and MCS selection.

As illustrated, packet 1100 includes a preamble 1110 that is formed of two fields, a first variable-length training field 1112 (STF1) that includes a repetitive sequence to enable a low power packet detection and a second (potentially) variable-length training field 1114 (STF2) that provides a signature for detection validation (and potential filtering to stop packet processing if the signature does not match the receiver expectations).

Packet 1100 further includes a header 1120 that can include a first variable length field 1122 that is configured as a long training field used for synchronization refinement and to potentially provide range information refinement, a second variable length field 1124 that is configured as a first packet header field (PHR1) to provide top mode signaling including group information, potentially additional range information or refinements, and a second variable length field 1126 that is configured as a second packet header field (PHR2) to provide additional signaling information, including MCS and/or length information for a data field 1130, which includes variable length data. Note that data field 1130 may include a given payload. Understand while shown with a particular implementation in FIG. 11, additional or different fields having different information and configurations may be present in other implementations.

For example, a preamble could be used not only for packet detection, validation and synchronization, but also to filter/identify a given network/service/ID. In this way, a preamble may directly provide a way for an early break (to continue receiver processing only if the packet is intended for a valid network/service). The preamble may also provide rough initial range (and maybe group/ID) information too, before the header.

Then, there can be two options to provide main Range bits, but not exclusive (progressive refinement). For instance, a part of the scaling/range, high-level, could be fixed/pre-negotiated (e.g., at device association on the network), defining the sequence length and RGS info as a quasi-fixed definition from a beginning of a packet, (e.g., directly from the beginning of a preamble); and/or another part (finer granularity of range) could be defined in the preamble as a pool of signatures (e.g., double the number of ranges, adding 2 signatures per range that the receiver will be able to distinguish) and/or in header fields (fields to still refine granularity of range). The same split of information for IDs (or groups of other information to identify/split among networks or users). For example, a network/service ID at a preamble validation process could avoid further decoding of packets that are not for a given network ID that receivers expect given signatures among a pool. Such information could be provided at an end of a preamble and/or a beginning of one or more header fields.

Of course in other implementations, there can be different or additional fields within a packet and other scalability features are possible.

In embodiments there may be additional system choices for the various packet fields. In some cases, the STF1 and STF2 fields may be fixed for a selected network configuration. However, as STF1 is a repetition of recognizable sequences designed to target a given sensitivity, its length can be updated to match a range/sensitivity dimensioning of a current packet (e.g., adding some repetitions to target a lower sensitivity, to allow a receiver to detect it in a more difficult and noisy channel at the expense of a longer packet) without altering the algorithms. In other cases, STF1 and STF2 fields could have a small power boost factor (and/or rescaling factor by reducing the sampling rate, that would simultaneously reduce the bandwidth and increase the duration), to improve performance while still being within regulatory constraints, e.g., if these parts have a lower PAPR under a maximum-power constraint. As the LTF/PHR1/PHR2/DATA fields can be based on the same SS sequences discussed above, any or all can be used at a receiver to improve synchronization.

One example of dimensioning technique is now described. First, a LTF can be implemented as a non-modulated PHR1, plus a simple specific coding based on simple inversion of real and/or imaginary parts of the SS (=conjugate=inverse-sweep=orthogonal sequence). These coding options allow delivering 2 bits of information for a main Range, to scale the packet structure (and potentially use this first level information as a top Group-ID1 for PHR1 and subsequent packet fields). This assumes a blind detection at receiver of these $2^2=4$ potential sequences to select these 2 main bits of RanGe Scheme mode (RGS). These 4 modes also correspond to (up to) 4 LTF lengths to optimize synchronization vs. range. This arrangement also allows early stop (back to sleep) of decoding if the packet is not for the user (if we consider 4 modes, there is a 75% drop probability), for power savings. It assigns one of the 4 MCSp1 (as shown in Table 5, where MCSp defines MCS for PHR1) for the following PHR1.

Lower Range modes assume short SS sequences, while longer Range modes use a standard SS (e.g., 'twice-length'). Once this SS length is defined, the same SS length may be assumed over the packet, and subsequent signaling will play on other parameters and MCS to balance range/performance.

PHR1 contains information to refine the Range mode/MCS for the following parts and the Group information. In an embodiment, PHR1 contains 5 bits: 1 bit used to refine the Range/MCS list for PHR2 and DATA, and 4 bits to refine the Group-ID2. In other words, the robust PHR1 contains top-level budget public information to define 8 MCSq (where MCSq defines MCS for PHR2) (3 bits: 2 from LTF and 1 from PHR1) for PHR2 to further scale and optimize length vs robustness; and a GroupID information from this signaling is used to select the Recipe to construct SMEs (and improve Packet-Interference-Mitigation), and also potentially update the scrambling of binary content.

PHR2 can potentially be modulated at higher throughput (among the 8 MCSq), and contains remaining signaling information. For example, it can contain MCS data details for DATA, Data FrameLength, options for framing, validation, addressing or other packet control.

In an embodiment, PHR1 and PHR2 are block-encoded. Such forward error correction (FEC) allows efficient adaptation of the number of input information-bits to the number of coded-bits to fit the number of dedicated SMEs (in particular to be a multiple of the number of bits per SME). Moreover, such coding schemes on small blocks can efficiently consider trade-offs with embedded detection of errors and correction, potentially removing the need of costly (long) CRC for validation, and allowing a process stop if the packet is not relevant (reliable/decodable) for the user.

Efficient FEC and bit-interleaving/mapping, optimized for each part (PHR1/PHR2), can be considered, with good capacity of error detection and correction (e.g., ensure an error misdetection probability $<10^{-5}$) while allowing one or more bits to be corrected for each PHR part, with adapted brute-decoding for small PHR1 and optimized-iterative decoding for PHR2.

A data portion may be modulated as defined in the final MCS combination from previous signaling. In one embodiment, 8 MCS modes per Range mode may be used.

Note that additional improvements are possible (e.g., merging LTF with either end of preamble or PHR1, reducing LTF length performing sync-timing on PHR1 content with potential iterative demodulation, header compression, etc.).

The following details are provided for the STF part (also referred to as PDF for "Packet-Detection-Field"). Depending on implementation, several solutions are possible. To integrate existing standards as an add-on, the first detection part could be similar to the considered standard (e.g., IEEE 802.15.4g WiSun STF). To improve detection and synchronization for Long-Range systems, the sequences can be improved, e.g., considering non-equally spread tones in frequency (and optionally evolving content over STF1 and STF2, especially to allow variable-length STF1 while improving synchronization capabilities in the STF2 part), with well-chosen complex phase values to reduce PAPR.

To further capitalize on frequency-sweep SWAM-like signal shapes, the preamble could be based on such frequency sweeps (SS), or combinations of frequency sweeps, to allow easy/efficient packet detection while keeping PAPR very-low (additional power compression and power boost is also possible). A given signature can then validate the packet start, and could also select sub-groups to minimize unneeded demodulation. Moreover, this could allow use of the same algorithm on a larger part of the packet, to "merge" packet detection or synchronization parts with signaling parts (e.g., replaying the recorded signal at receiver if needed).

Then, it can be merged at least with LTF. Synchronization on such sweeping sequences (sweep at sample-level and repetition at block level) allows rather simple (first combination/sum to reduce noise, sweep tricks for combined-sync time/frequency) but efficient and scalable fine time and frequency synchronization.

In one example, a preamble can have irregular active-subcarrier spacing and frequency-shift at a block-level. One example preamble could be to use a 'zigzag' STF1 (using a given default preamble (SSp) with low PAPR, with a STF1 formed of repetitions of this SSp and time-reversed or conjugate of SSp), with sufficient repetitions for the targeted range; and a 'signature' STF2, which validates that a packet from this standard is detected, and improves synchronization in time and frequency (removing potential ambiguities).

Note that the initial part (STF1 repeated pattern-signals) can be scalable in length (e.g., number of repetitions) to respect the advised principle of homogeneous scalability over the packet for a given targeted range. Increasing the STF1 length allows receivers to hang more long-range packets (increase detection probability, targeting lower SNR/sensitivity), for worst-case ranges. Examples of global STF duration for each Range is provided in Table 5 above (8 ranges for 8 lengths).

The following details are provided for the LTF part (also referred to as VTF for "Variable-Training-Field"). In an embodiment, the LTF can use the same SS as PHR1. As an example, to provide the 2 bits of RanGe Scheme mode (RGS), 4 types of LTF are defined, with potential relations between them to easily and blindly detect these modes at receivers. Typically, 2 SS and/or simple operations of inversion (conjugation) on real and imaginary parts of portions of the signal (like is done with SWAM recipes on SS) allow simple and efficient (including low-power) detection of these SS-based signals with good properties, and efficient synchronization at receivers. As the 4 modes correspond to 4 targeted ranges (and related SNR levels), longer-range modes will have longer LTF, the LTF SS repetitions/recipes lengths can be customized to this range mode to enhance efficiency with well-calibrated packet parameters and lengths (homogeneous scalability is key; 4 RGS in LTF=4 lengths). Exit conditions can be customized also.

Note that at a receiver, a channel profile (CIR) could also be deduced from the preamble+LTF processing. This could help algorithm customization in the receiver, and could also be potentially reported for subsequent MCS choices in future packets (enabling high-level control, e.g., by adjustment of the MinShift parameter to set the number of bits per SME symbol). Also note that at the receiver, for synchronization refinement, algorithms could consider STF/LTF, and the following parts (like PHR1) as they are based on the same kind of sequences (e.g., once demodulated PHR1, adjust sync, to increase robustness for PHR2 and subsequent signal).

The following details are provided for the PHR1 part ("Packet-HeadeR 1"). The PHR1 contains main header information, to further scale the subsequent packet signal (PHR2). Consequently, only a few bits are provided in this robust part to be efficient. A main refinement of Range/MCS and Group can be given here. In an embodiment, the robust PHR1 containing top-level public information may be provided using 5 bits: 1 more bit to be used to refine the Range/MCS list (for subsequent PHR2 and DATA, to enhance the granularity of rate vs error-probability); then it will allow selection from among 8 defined MCSq (3 bits: 2 from LTF and 1 from PHR1) for PHR2 to further scale and optimize length vs robustness; and 4 bits to define the Group-ID2 (for subsequent PHR2 and DATA, to enhance the robustness vs interferers and similar packets). This part also allows selection of the Recipes to construct SMEs (and improve Packet-Interference-Mitigation) for next parts, and also potentially update the scrambling of binary content.

PHR1 follows the principle of scalability, like LTF, with an MCSp (and then duration) adapted to the range of the packet (4 RGS from LTF=4 lengths). Then, in an example, up to length (RGS)=4 MCSp can be defined and used for PHR1. Examples of proposed MCSp$\{0,1,2,3\}$ are shown in Table 5 above. Good block-encoding like BCH(15+X,5) may be used, where X=$\{0,1\}$ for instance, depending on MCS to match symbol constraint (to be multiple of 2 or 3 bits).

The following details are provided for the PHR2 part ("Packet-HeadeR 2"). The PHR2 contains additional header information, to further scale the subsequent packet signal (DATA). Consequently, more bits are provided to refine MCS and Group for DATA part, and also to provide useful information like DATA length (e.g., number of bits or bytes or non-uniform length mapping to save bits in this header while covering a fairly-wide range of packet sizes), and other packet and system information (e.g., one or more of TX-power, Version, TRX mode, Retry mode, Security options, CRC mode, ACK mode, or so forth). In one embodiment, the PHR2 may contain approximately 16 bits, as follows: 3 more bits to refine the MCSdata to define 8 potential MCS per Range, for DATA transmission to further scale and optimize length vs robustness; 7 to 8 bits to set Frame-Length (could depend on the MCSq mode); 2 to 3 bits to set TX-power; and 3 or more bits for Packet and System information (e.g., modes for Version/TRXmode/Security/CRCmode/Retry, etc.). PHR2 follows the principle of scalability, like LTF/PHR1, with an MCSq (and then duration) adapted to the range of the packet (8 Ranges from LTF+PHR1: 8 lengths). Then, in an example, up to length (Range)=8 MCSq can be defined and used for PHR2. This field may use good block-encoding like BCH(30+Y, 16), where Y=$\{0, 1,2,3 \ldots\}$ depending on MCS to match symbol constraint to be multiple of 2 or 3 bits, and also customize robustness.

The following details are provided on the DATA part (also called "PSDU" content). The Data part is scalable in number of bits contained (defined from previous field FrameLength in PHR2) and in MCS (from the 8 MCSdata defined for each of the 8 Ranges). The PSDU payload includes a MAC header (variable with more fields), Data content (and potential tail/padding) and CRC (options). Note a GroupID and Security mode may also impact the transmitted signal. Then, a data portion from approximately 1 ms to more than 1 second could be defined depending on the parameters.

In various embodiments, system-wide high-level smart management of packet parameters may occur to optimize communications with one or more devices considering all of range, users in the environment and feedback information regarding prior communications.

In one or more embodiments, the Range parameter can be defined from fixed/expected channel characteristics between transmitter and receiver (including, for example, distance/echos/SNR) and/or refined from previous information/exchanges (such as RSSI of previous packets, rough estimation of SNR/RSSI at commissioning, or so forth). Even for a given parameter (e.g., Range), a part can be implicit (or fixed by the network or at network registering/association or any previous exchange) and another part explicitly coded in the packet. Note that error rates and retransmissions could also be used to adjust following packets' range level.

In one or more embodiments, the Group parameter can be selected randomly, and/or from UserID/address information, and/or from a computation or negotiation with the network for a given user or transmission. In selecting the GroupID, goals of maximizing global capacity and minimizing probability of interfering packets may be considered.

System-level management can improve selection/adaptation for each user. Moreover, in a star system with Gateways (GWs) that can be more complex with power and space adaptation per user packet, beams can be adapted to reduce interferences (path angles, powers, MCS, sequences and orthogonality management for packets in closer areas) on a given band. Specific subgroups (of sequences) quasi-orthogonal to other can be defined to ensure better behavior (and orthogonality) for specific packets (first or specific access, control, quality of service (QoS) or so forth). As an example, embodiments may define certain modes/groups with better characteristics (e.g., best SS and Recipe combination) for highest priority packets.

Embodiments may also leverage flexible packet definitions as described herein to perform link adaptation, providing coherent and flexibility using the modulation described herein (where each device packet can have different targets, budget/sensitivity/range, rate, capabilities and so forth). As discussed above, various parameters can provide degrees of freedom to optimize wireless links. Such degrees of freedom may include: SWAM modulation based on control of one or more of Range, MCS and Group information; header/control updates based on link information including power, data lengths, channel band-like information, addressing; security, application and MAC-level information.

Depending on use case, there may be several levels of parameter adaptation (e.g., fixed, slow, quick). There can be different ways to exchange/adapt these parameters. In some cases, parameters can be controlled by: fixed pre-negotiation or defined at association; measures including channel quality (e.g., LQI/RSSI/SNR/CIR); exchanges with information in each packet/header or dedicated control; and/or receiver a priori knowledge vs blind detection.

With sub-group assignments, there can be dedicated groups for specific packets. For example, a special configuration may be provided for robust/specific packets. Or there can be a smart allocation of channel bands and groups in each band for different associated devices (packet interference mitigation optimization for the network system), enabled using flexible SWAM modulation in accordance with an embodiment.

Embodiments may also enable high-level error mitigation. For example, packets may be retried with different group information. Such variations may mitigate signal issues in the given channel. In other cases, retried packets may be sent using constant group information, which may allow reliability aggregation of received packets to recombine soft information at an application server to properly decode the data.

In various embodiments, there can be a variety of different entities that process communications between an end node and a target application or service that executes on one or more application servers. In long-range scenario as described herein, there may be multiple intermediaries between communicating devices. For example, between a wireless device and a cloud-based server, there can be multiple intermediary components, including multiple gateways that may receive and at least partially process incoming packets, and cloud-based devices, including one or more network and/or application servers.

Figure 12A:
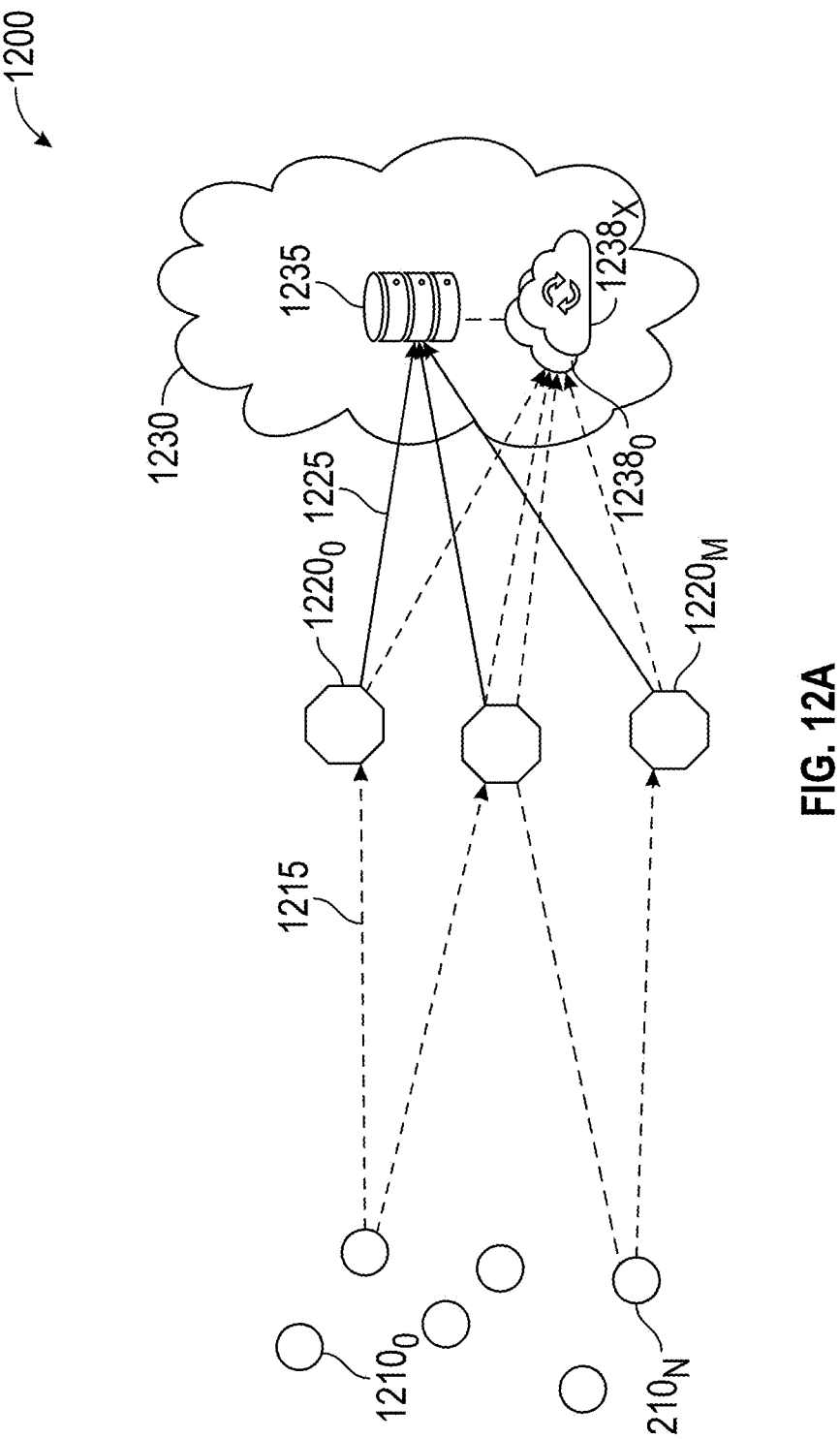
FIG. 12A is a block diagram of a long-range network environment in an uplink direction in accordance with an embodiment.

Referring now to FIG. 12A, shown is a block diagram of a long-range network environment in an uplink (UL) direction in accordance with an embodiment. As shown in FIG. 12A, network environment 1200 includes various devices in communication. End node devices $1210_{0-N}$ may, in different implementations, be any of a variety of wireless devices, ranging from small, low power devices, such as IoT sensors, actuators, smart meters or so forth, to larger wireless devices. In many embodiments, end node devices 1210 may be low-cost low-power devices. In some cases, devices 1210 may be configured for asynchronous mode by default, at least for UL communications. Also, devices 1210 may be configured to operate with no fine synchronization or beaconing/listening requested to save power, and be adapted to long range communications in free bands. Depending on implementation, several power profiles could be defined (with potential regular wake-up windows and UL-DL relative times) to trade-off latency, triggers and energy minimization. End node devices 1210 may be configured for half-duplex exchanges (generally on the same frequency band for TX and RX) at sub-GHz wireless on free ISM bands (e.g., approximately 800/900 MHz).

In turn, end node devices 1210 couple via wireless links 1215 with a set of gateways (GWs) $1220_{0-M}$. As will be described herein, gateways 1220 may be configured to partially process uplink packets, e.g., to detect relevant packets, filter them, then determine soft decisions, and send these resulting packet/physical information and soft decisions to a cloud-based location. GWs 1220 thus may be configured to route traffic between end node devices 1210 and a network, (represented as cloud 1230, e.g., including internet/cloud/servers) and maintain and manage parameters of communications with end node devices 1210.

In certain embodiments, GWs 1220 may be configured with an additional addressing root (e.g., MSBs of a Unique Network ID to avoid transmitting too long ID on the wireless link, e.g., 64b). At network association (e.g., initial registration, reset or so forth), this addressing root may be shared with end node device 1210. In a similar manner, a node ID versus other IDs (PHY/MAC/Link/IP) could be merged/derived/deduced, to limit the number of bits/redundancy in a packet.

Specifically as shown in FIG. 12A, gateways 1220 couple via wired and/or wireless links 1225 with a network server 1235 which may be a cloud-based server implemented in a cloud 1230. In embodiments, gateways 1220 may exchange useful management and/or control information with servers and other devices behind them in cloud 1230. As further shown, within cloud 1230 there may be a set of application servers $1238_{0-x}$. As shown, application servers 1238 may be in communication with network server 1235 and potentially one or more gateways 1220. Although shown with a limited set of components in FIG. 12A, understand that there may be additional intermediary devices that couple between gateways 1220 and cloud components. For example, while a single network server 1235 and application servers 1238 are illustrated, there can be various servers present to perform the different operations described herein, including recombinations (e.g., from several gateways) and decoding, network management and registration, network databases, statistical measurements and so forth.

In one or more embodiments, cloud 1230 may include at least a network server that manages IDs, keys and/or user certificates, and in some cases end node parametering and routing information. Although embodiments may centralize main packet parametering in a server, depending on the information level, portions could be managed in gateways 1220 and cloud 1230. For example, end node devices 1210 and gateways 1220 may share low-level/wireless capabilities. And all devices may share some ID information and/or default Range/Group information, and downlink physical/modulation settings (e.g., MCS, power, bands and so forth) from previous exchanges. Data and application server(s) may be configured to manage the data and user services (useful traffic), with related credentials and other high-level information. Such servers may include typical hardware including one or more processors, memory, storage, interface circuitry and so forth.

Still further, understand that there can be many different implementations of cloud 1230, ranging from small systems (e.g., for a small/private network) to a large cloud-based datacenter having a substantial number of servers. As an example, for a small/private network, a single server may be used for both network server 1235 and application servers 1238, while more complex cloud/split systems could be implemented for large and complex networks (with potentially geographically diverse network server 1235 and application servers 1238). And depending on implementation, gateways 1220 may be co-located with components of cloud 1230 (or not).

With embodiments, high-level error mitigation may be performed by leveraging gateways 1220 to partially process uplink packets and send resulting information along to network server 1235 and/or application servers 1238 to enable potential aggregation and smarter generation of hard decisions.

In various embodiments, end node devices 1210 may be configured to wake up when necessary to send messages in packets. Such communications may be performed in an asynchronous mode with scalable packet parametering based on prior exchanges and/or settings. As discussed above, such scalable packets may include preambles, headers and data portions having variable lengths depending upon such parametering.

Still with reference to FIG. 12A, gateways 1220 are configured to detect and synchronize incoming packets. In response to a packet detection, a gateway 1220 may demodulate and decode a header of the packet and perform appropriate measurements such as various signal quality measurements. Based at least in part on such measurements, statistical information, e.g., as present in a network management database, may be updated. Note also that aggregation of measurement information from multiple gateways 1220 and network server 1235 enable improvements in network management information, to optimize network settings. For example, based at least in part on such measurement information, default end node device parameters like Range/MCS/Group and/or power and band, e.g., for SWAM modulation, can be updated. As another example, routing information including a default downlink gateway can be defined or updated for a given end node device from these measurements and information.

Still further, gateway 1220 may be configured to demodulate a data portion of a packet. However, instead of generating a hard decision, and thus decoding the actual bits of the underlying message, gateway 1220 is configured to generate soft information. In one embodiment, the soft information may be in the form of soft symbol reliability information, such as in the form of a LikeliHood Symbol (LHS) as a vector of reliabilities, e.g., soft values for each of the possible symbols among $2^M$ possibilities (if there are M bits per symbol), compared what is received versus what could be expected from SWAM modulation. In another embodiment, the soft information may be in the form of soft bit decisions, such as a Log Likelihood Ratio (LLR) with a soft value for each bit in the symbols (e.g., deduced from the LHS). The resulting soft information may be communicated upstream, e.g., to network server 1235 (which in some cases may indicate the form of the soft information to be received).

In turn, network server 1235 may be configured to gather soft information from multiple gateways 1220, where this gathering operation is performed for the same originating packet from a given end node device 1210. As such, network server 1235 may receive multiple sources of soft information for a single packet as communicated from a given end node 1210 through multiple gateways 1220. Based on these multiple soft decisions, a server 1235 may be configured to aggregate these decisions to obtain the original message decoded, which may be deciphered in a given application server 1238.

Note that there may be variations in the split of processing between gateways 1220 and cloud components. In one embodiment, a given application server 1238 may be the final destination for a message (where it is also deciphered) for a final client/application/service. In turn, one or more intermediate network servers (e.g., network server 1235) could perform networking work (e.g., adaptation, allocation, registration, statistics, measurements, database updates, and control/management of entities). However in some cases, network server 1235 can also manage the recombination of soft-information and decoding before providing a final (binary) message to application server 1238

Also depending upon use case, there may be multiple levels of encapsulation with packet size dynamically configured to minimize length while ensuring acceptable levels of recovery of the information. In some embodiments, block decoding may be performed to allow the beginning of data portion decoding for purposes of obtaining a MAC header. Also depending upon use case, various security levels may be provided for different portions of a packet, e.g., header and other packet portions.

With an arrangement as shown in FIG. 12A, gathering soft information from several gateways may optimize a wireless resource, to benefit from best wireless paths in a given instant, spatial diversity, and robustness with redundancy via multiple channels. Still further, such arrangement allows reliability aggregation of received frames to deduplicate packet information and recombine soft information at a cloud location to properly decode data messages.

In some implementations, additional diversity may be realized by packet retries, where a source retries a packet communication when decoding is still unsuccessful. For these retransmissions, various SWAM parameters (including group ID and MCS) may vary between the retransmissions. Note that such varying of parameters may trigger a tradeoff. That is, while signal issues may be mitigated within a given channel, recombination of symbol information at a destination may increase complexity.

In one embodiment, packet retries may maintain the same modulation parameters for a given number of retries (e.g., two). In turn, a smart recombination of these packet retries may occur at a cloud destination based on receipt from multiple gateways. Such operation may result in better decoding of data, and increase a potential range of a long-range wireless environment, increasing success probability and avoiding too many retransmissions that degrade an overall global system and waste resources.

In some embodiments, note that packets can be configured with additional information. For example, a header field (e.g., PHR2) can take the basic form discussed above (e.g., MCSdata, FrameLength, TXPower, Packet and System Information like Version, Security, TRX and CRC Modes) or it may be extended with additional information fields for version, frame type (with security information, and so forth).

In these or other embodiments, an additional header field, PHR3, may be provided ahead of data (to dissociate some MAC header information that could be useful at a GW), e.g., main relevant MAC and link layer information to identify frames and a target server. This header information may be used at a gateway to enhance filter capabilities at the GWs (and potentially provide an early decoding stop). This extra information may include one or more of the following information: extra frame control like frame type (e.g., including security information, TRX/CRC modes) and addressing format (e.g., 1 or 2b for short/long formats); frame/sequence counter (the same for retries and from all GWs, e.g., 6b); a wireless network ID (e.g., 16b for a max nb of wireless network identified in a given are); node ID (16 to 24b to identify end node device, or a list of rotating IDs at each packet sent) and extra security information; an optional destination/service ID; and/or a small CRC (e.g., 8-10b) that could be merged with some counter/security/ID for cross-validation.

Also, by providing soft information in measurements to a network, the network may be better managed with relevant KPI and statistics to optimize routing allocation and resource usage.

Figure 12B:
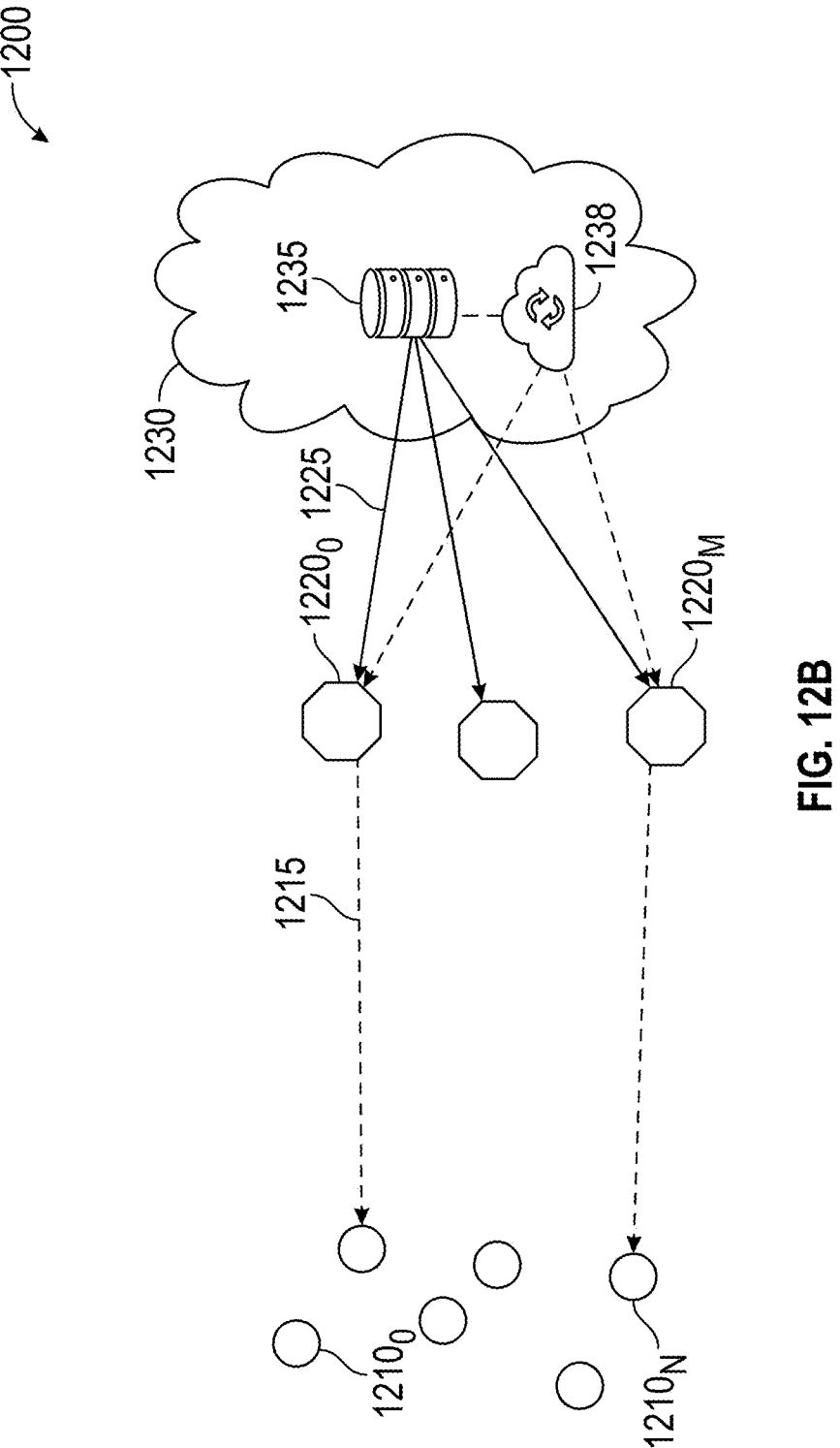
FIG. 12B is a block diagram of a long-range network environment in a downlink direction in accordance with an embodiment.

Referring now to FIG. 12B, shown is a block diagram of a long-range network environment in a downlink (DL) direction in accordance with an embodiment. Note that the same entities are present, although there are different connections between end node devices 1210 and gateways 1220. Namely, there can be a single primary gateway 1220 that is configured to send DL packets to a given end node device 1210.

In this downlink direction, network resources within cloud 1230 and gateways 1220 may have information to select the best routes and settings for downlink traffic. Such information may include measurements, statistics, registration, routing information, and so forth. In turn, settings may include privileged gateways and associated parameters for each end node device. In this way, wireless resource usage may be optimized. Thus as shown in FIG. 12B, a single path from a single gateway 1220 to a given end node 1210 is generally sufficient. Also note that frequency band adjustment and multi-gateway transmission may be used to extend range, to customize an equivalent wireless channel.

When an end node device 1210 enters a network environment, there may first be a registration/association process to register on network 1200 and/or one or more application servers 1238. Thereafter, normal exchanges can occur, including asynchronous uplink packets when end node device 1210 has information to be communicated. Default customized settings (e.g., Range, MCS, Group/IDs) can be agreed for the registering device, for subsequent packets.

Gateways 1220 may be configured primarily to route traffic between end node devices 1210 and network components within cloud 1230, as well as to manage and maintain parameter information.

Figure 13:
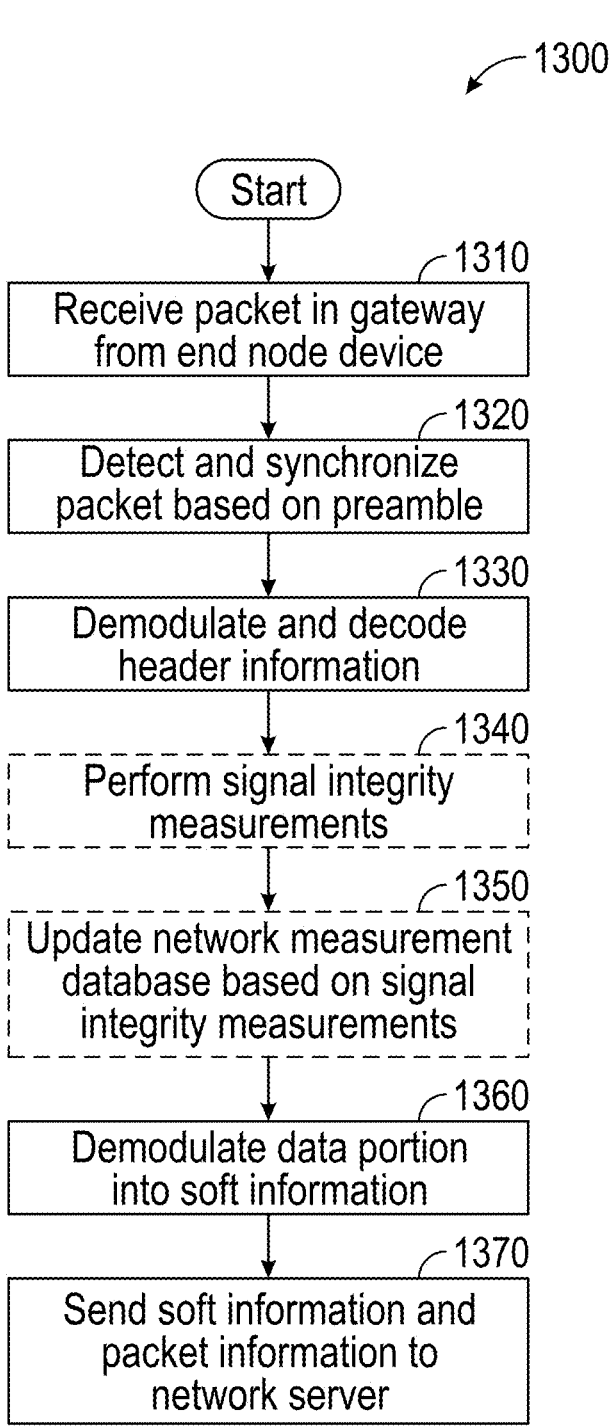
FIG. 13 is a flow diagram of a method in accordance with an embodiment.

Referring now to FIG. 13, shown is a flow diagram of a method in accordance with an embodiment. As shown in FIG. 13, method 1300 is a method for performing operations on a received packet in a gateway in accordance with an embodiment. As such, method 1300 may be performed by hardware circuitry of a gateway (including RF and baseband circuits) alone and/or in combination with firmware and/or software, which may be implemented as instructions stored in a non-transitory storage medium.

As illustrated, method 1300 begins by receiving a packet in a gateway from an end node device block 1310. Next at block 1320 the gateway may detect and synchronize the packet based at least in part on the preamble as the preamble is formed of a repeated sequence, as discussed above. At block 1330 header information of the packet may be demodulated and decoded. As discussed above, the header may include various information that the gateway may use in determining whether the packet is directed to a destination associated with the gateway, as well as other information such as parameters regarding the packet, e.g., a packet structure and lengths, physical layer information, and potentially destination information such as an identifier, addressing information and/or MAC and link layer information.

Next at block 1340, optional signal integrity measurements may be performed based on the packet. Such signal integrity measurements may vary depending on implementation. In some cases, a gateway may be associated with a network controller and/or a network management database. In such cases, and when optional signal integrity measurements have been performed, the gateway may at block 1350 optionally update the network management database based on the signal integrity measurements.

Thus a gateway may make various determinations based on measurement and header information. For example, the gateway can filter a packet from further processing or upstream communication based on signal integrity measurements (e.g., correct ratio signal power vs. noise, sufficient channel characteristics or so forth). Also, the gateway may use header information to determine whether the packet is for the considered network/managed application, otherwise the gateway may filter the packet from further processing or communication upstream. As such, a gateway can use all useful information to filter packets early, to optimize network paths (and stop if the packet is not relevant). Although embodiments are not limited in this regard, filtering of packets may be performed based on one or more of: quality of the incoming RF signal; packet useful for the network(s) managed by a GW (could be based on one or more of an identifier in a list, a network ID that matches an expected network ID, a valid destination address or so forth) to avoid demodulation if the packet is not for the considered network managed by a given GW. Additionally, filtering also may proceed based on potential blacklists, or avoiding use of a gateway with lesser quality statistics (when other available gateways have higher statistics).

In various embodiments, the GW may perform several physical/RF signal level measurements, like received powers and noises, and any other channel measurements characteristics (e.g., received strength signal indicator (RSSI), noise levels, interferences, to define ratios like SNR/SINR; channel impulse response (CIR) to know maximal spread and echos) so as to customize maximum MCS. This information, when combined with decoding information (also done in the server for the data part), can be used to optimize the network parameters.

At block 1360, if it is relevant (i.e., if the packet is not filtered but validated to be further processed), the gateway may demodulate a data portion of the packet into soft information. In different implementations this soft information may be in the form of soft symbols or soft bits. Note that the demodulation process may proceed based at least in part on information present in the header of the packet, such as MCS information as present in one or more packet header fields.

Finally at block 1370 this soft information for the data portion along with associated packet information from the headers may be sent to a network server. As discussed above, this network server may couple to the gateway via a wired or wireless connection. Although embodiments are not limited in this regard, as some examples the packet information from the headers may include Range, Groups, MCS, Transmit Power, Band, CRC modes, relative transmission (UL/DL, response, acknowledge, etc.) windows and modes and miscellaneous frame modes and control fields.

In some cases, packets can be communicated with security considerations. For example, only encrypted and undecoded data soft information, and re-encrypted extra information (from headers, measures, etc.) can be transferred on the network to still increase and ensure a high-security-level.

Note also that the data transfer between gateway and server may have various tradeoffs. These tradeoffs can balance overload (frame soft information size vs. performance), compressing soft information per symbol (e.g., keeping only a few bits of information) and/or mainly accuracy on the most significant/probable/reliable LHS per SME. Understand while shown at this high level in the embodiment of FIG. 13, many variations and alternatives are possible.

With embodiments leveraging aggregation, just as data decoding is based on a recombination of multiple SS/SMEs, recombination of information from multiple gateways may occur by processing SMEs from multiple gateways when available to increase reliability or decrease probability, while keeping wireless usage low, e.g., with short packets having minimal retries. Optimization of communications may be extended to a multi-level optimization with several parameters, including range, MCS, group information, transmit power, frequency band, and so forth within a global system with many devices and long range. The received packets allow evaluation of the paths between end node devices and gateways to adjust statistics and to evaluate best paths for DL transmissions, potentially also deactivating transfers from worst gateways for some end node devices if other paths are sufficient with far better signals (adjustment of devices and network parameters, routing, TX powers and so forth).

Figure 14:
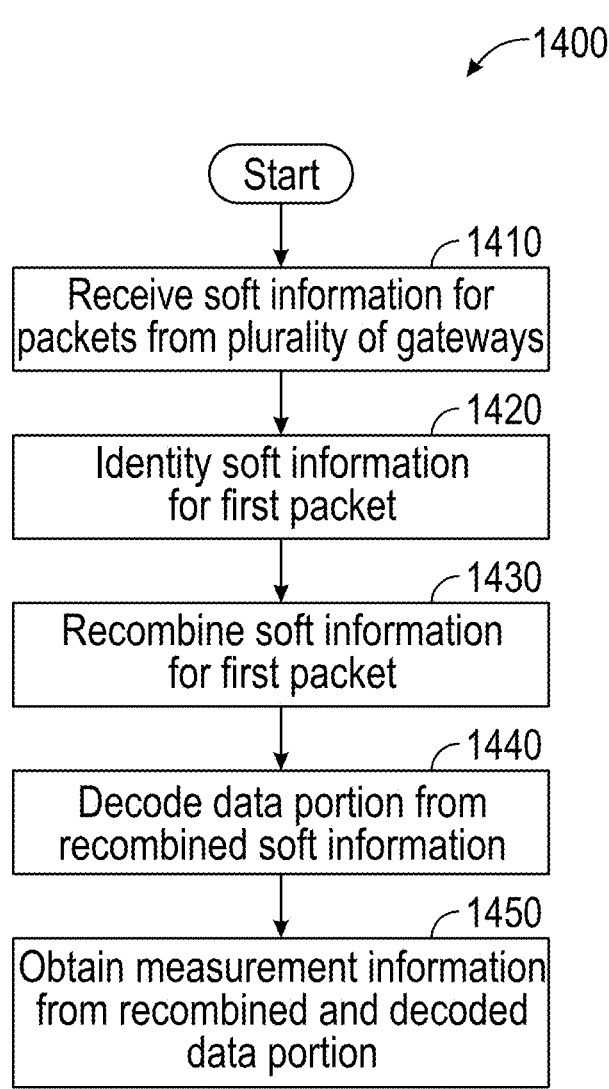
FIG. 14 is a flow diagram of a method in accordance with another embodiment.

Referring now to FIG. 14, shown is a flow diagram of a method in accordance with another embodiment. As shown in FIG. 14, method 1400 is a method for performing operations on received packets in a server, where multiple versions of the same packet may be received from multiple gateways in accordance with an embodiment. As such, method 1400 may be performed by hardware circuitry of one or more servers (including packet processing circuitry) alone and/or in combination with firmware and/or software, which may be implemented as instructions stored in a non-transitory storage medium.

As shown, method 1400 begins by receiving soft information for packets from a plurality of gateways (block 1410). While this soft information may be for a stream of packets, for purposes of discussion, assume that the soft information is for a single packet, as received and processed in each of multiple gateways that in turn send the soft information along to the network server. Of course, additional information may be received from the gateways, including the associated header information as discussed above. Next at block 1420, soft information for a first packet may be identified from the received soft information and the associated header information, which identifies this particular packet.

Still with reference to FIG. 14, next at block 1430 the soft information for this first packet may be recombined. At a high level, the soft information recombination may include deduplication, weighting, and aggregation of the soft information from these multiple instances of the received packet.

The principle of soft-recombination is similar to the SWAM principles. Typically, for a given sent packet with several symbols (each SME symbol being already a weighted combination of several SS), each symbol is potentially received in several GWs. Thus there is sufficient soft-information per symbol for the soft decoding to be as reliable as possible (as diversity increases robustness of the estimation).

Several receiver recombination algorithms are possible. In one simple example, the best GW (or N best with typically the highest SNRs) can be identified, and decoding proceeds based on its soft-symbol information. In another example, the soft information is summed (or weighted-summed based on the measurements like SINR information for each GW to overweight best GWs and lesser (or not consider) the least reliable GWs), on a per soft-information basis, before using them as a soft-input for decoding. The general idea is to optimally use redundancy, and keep all the soft information before making (hard/binary) decisions. In some cases, a network server/application/client may be configured to balance complexity of recombinations (processing, several recombination solutions to check, more recombinations, more related measurements) versus the improvement in packet error rate (to find a better chance to decode without having to retransmit a packet).

After the soft information of the packet has been combined, the data portion of the packet can be decoded (block 1440). That is, a set of hard decisions may be obtained from the recombined soft information, e.g., in a FEC decoder, to obtain the original message content of the data portion of the packet. If the message is properly decoded (e.g., data CRC is correct), then the message is provided to and deciphered in a given application server. Note that in some cases, the order and number of decoding tentatives based on one or several recombination types is not defined, and may be determined by a client analysis of dimensioning versus packet retries at a higher level. There can be different decoding strategies and decoding tentatives considered, e.g., decoding first the best GW, or a weighted combination of the N most relevant GWs (from the received signal measurements and KPI metrics).

Still with reference to FIG. 14, based at least in part on the recombining and decoding, measurement information can be obtained (block 1450). Such measurement information may include signaling characteristics of different gateways. For example, in gathering (and combining) soft information, relative information may be determined between GWs (where there may be ranking of signal characteristics among GWs). Also decoding a packet can give a final packet error ratio (e.g., success or not with correct CRC validation). In turn, a network management database may be updated based on the measurement information.

In one embodiment, soft information from each GW (or the N best) can be independently used to try decoding the message. In this way, the successful GWs are a priori more robust for a given source (end node device). Also, the decoding can provide metrics for each decoding block that helps in ranking the soft information reliability, which progressively improves statistics reliability to manage the network and parameters (to always target adapted parametering to optimally use the wireless resource having just the needed margins e.g., rate and/or performance). As an example, a distance between decoded messages and soft symbols from each GW gives an idea of the link reliability (noises and interferences) between end node device and GWs. Note that GWs and servers (in particular network and recombining devices) may keep in sync when updating their device-management parameters. Understand that in some implementations, this obtaining of measurement information and database update may be optional for at least some packet handling, to increase efficiency. Although shown at this high level in the embodiment of FIG. 14, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

receiving, in a receiver of a gateway, from a wireless device a radio frequency (RF) signal comprising a packet and processing the RF signal to obtain a digital stream comprising the packet;

detecting and synchronizing, in the gateway, the packet based at least in part on a preamble of the packet;

decoding, in the gateway, a header of the packet to obtain information associated with the packet;

demodulating, in the gateway, a data portion of the packet into soft information; and sending at least a portion of the decoded header and the soft information from the gateway to a server coupled to the gateway to enable the packet to be decoded using the soft information.

2. The method of claim 1, further comprising:

identifying a destination for the packet based at least in part on at least one of the preamble and the header;

filtering the packet and not demodulating the data portion when the destination is not associated with the gateway; and demodulating the data portion when the destination is associated with the gateway.

3. The method of claim 1, further comprising demodulating the data portion of the packet into the soft information comprising soft symbol reliability information for a plurality of symbols of the data portion.

4. The method of claim 1, further comprising demodulating the data portion of the packet into the soft information comprising a plurality of soft bit decisions for a plurality of bits of the data portion.

5. The method of claim 1, further comprising:

determining, in the gateway, signal measurement information associated with the packet; and communicating the signal measurement information to a network controller.

6. The method of claim 5, further comprising receiving, in the gateway, an update from the network controller, the update comprising updated parameters for communication between the gateway and the wireless device.

7. The method of claim 6, further comprising sending, from the gateway, a downlink packet to the wireless device based at least in part on the updated parameters.

8. The method of claim 5, further comprising:

demodulating the data portion in the gateway when the signal measurement information is within a range; and not demodulating the data portion in the gateway when the signal measurement information is not within the range.

9. A method comprising:

receiving, in a network server, soft information of a data portion of a packet from each of a plurality of gateways receiving the packet from a wireless device;

recombining the soft information of the packet to obtain aggregated soft information of the packet; and decoding the data portion of the packet based on the aggregated soft information of the packet.

10. The method of claim 9, wherein recombining the soft information of the packet comprises deduplicating duplicated soft information received from at least two of the plurality of gateways.

11. The method of claim 9, further comprising:

weighting a first portion of the soft information received from a first gateway of the plurality of gateways with a first weighting; and weighting a second portion of the soft information received from a second gateway of the plurality of gateways with a second weighting, the second weighting different than the first weighting.

12. The method of claim 11, wherein recombining the soft information of the packet further comprises aggregating the weighted first portion of the soft information received from the first gateway of the plurality of gateways and the weighted second portion of the soft information received from the second gateway of the plurality of gateways, to obtain the aggregated soft information.

13. The method of claim 9, further comprising:

determining first statistical information based at least in part on a first portion of the soft information received from a first gateway of the plurality of gateways; and determining second statistical information based at least in part on a second portion of the soft information received from a second gateway of the plurality of gateways.

14. The method of claim 13, further comprising selecting one of the first gateway or the second gateway to be a primary downlink gateway for the wireless device based at least in part on the first statistical information and the second statistical information.

15. The method of claim 13, further comprising updating a network management database based at least in part on the first statistical information and the second statistical information.

16. The method of claim 9, wherein decoding the data portion of the packet based on the aggregated soft information comprises:

determining hard decisions for the data portion of the packet based on the aggregated soft information; and obtaining message data of the data portion based on the hard decisions.

17. The method of claim 9, further comprising receiving, in the network server, at least one of:

header information of the packet from at least some of the plurality of gateways; and measurement information regarding the packet from at least one of the plurality of gateways.

18. A system comprising:

a plurality of gateways to receive packet communications from a plurality of wireless devices in a long range wireless network, each of the plurality of gateways comprising first hardware circuitry, first memory, and first storage, wherein each of the plurality of gateways is configured to:

receive, from at least one of the plurality of wireless devices a radio frequency (RF) signal comprising a packet and process the RF signal to obtain a digital stream comprising the packet;

decode a header of the packet to obtain information associated with the packet;

demodulate a data portion of the packet into soft information; and send at least a portion of the decoded header and the soft information to at least one server; and the at least one server coupled to the plurality of gateways, wherein the at least one server comprises processing circuitry, second memory, and second storage, the at least one server configured to:

receive the at least portion of the decoded header and the soft information from at least two of the plurality of gateways;

recombine the soft information of the packet to obtain aggregated soft information; and decode the data portion of the packet based on the aggregated soft information of the packet.

19. The system of claim 18, wherein the at least one server comprises a network server to select, based at least in part on statistical information, one of the plurality of gateways to be a primary downlink agent for a first wireless device of the plurality of wireless devices.

20. The system of claim 18, wherein the at least one server is configured to:

deduplicate duplicated soft information received from the at least two of the plurality of gateways;

weight a first portion of the soft information received from a first gateway of the plurality of gateways with a first weighting;

weight a second portion of the soft information received from a second gateway of the plurality of gateways with a second weighting, the second weighting different than the first weighting; and aggregate the weighted first portion of the soft information received from the first gateway of the plurality of gateways and the weighted second portion of the soft information received from the second gateway of the plurality of gateways, to obtain the aggregated soft information.

* * * * *